United States Patent
Srinivas et al.

(10) Patent No.: US 8,718,697 B2
(45) Date of Patent: May 6, 2014

(54) MITIGATING INTERFERENCE USING COOPERATIVE SCHEDULING

(75) Inventors: Anand Srinivas, Medford, MA (US); Pierre A. Humblet, Cambridge, MA (US); Balaji Raghothaman, Hollis, NH (US)

(73) Assignee: Airvana LP, Chelmsford, MA (US)

( * ) Notice: Subject to any disclaimer, the term of this patent is extended or adjusted under 35 U.S.C. 154(b) by 516 days.

(21) Appl. No.: 12/575,113

(22) Filed: Oct. 7, 2009

(65) Prior Publication Data
US 2011/0081864 A1 Apr. 7, 2011

(51) Int. Cl.
*H04B 7/00* (2006.01)

(52) U.S. Cl.
USPC .......... 455/522; 455/63.1; 370/338; 370/328

(58) Field of Classification Search
USPC ............... 455/63.1, 522, 41.1–41.3; 370/328, 370/238, 272, 332, 252
See application file for complete search history.

(56) References Cited

U.S. PATENT DOCUMENTS

| | | | |
|---|---|---|---|
| 6,262,980 B1 | 7/2001 | Leung et al. | |
| 6,711,144 B1 | 3/2004 | Kim et al. | |
| 6,731,618 B1 | 5/2004 | Chung et al. | |
| 6,741,862 B2 | 5/2004 | Chung et al. | |
| 6,781,999 B2 | 8/2004 | Eyuboglu et al. | |
| 7,170,871 B2 | 1/2007 | Eyuboglu et al. | |
| 7,200,391 B2 | 4/2007 | Chung et al. | |
| 7,215,659 B1 * | 5/2007 | Chen et al. | 370/338 |
| 7,242,958 B2 | 7/2007 | Chung et al. | |
| 7,277,446 B1 | 10/2007 | Abi-Nassif et al. | |
| 7,299,278 B2 | 11/2007 | Ch'ng | |
| 7,558,356 B2 | 7/2009 | Pollman et al. | |
| 7,558,588 B2 | 7/2009 | To et al. | |
| 7,603,127 B2 | 10/2009 | Chung et al. | |
| 7,756,548 B2 * | 7/2010 | Laroia et al. | 455/522 |
| 7,962,091 B2 * | 6/2011 | Oyman et al. | 455/7 |
| 2002/0196749 A1 | 12/2002 | Eyuboglu et al. | |
| 2003/0100311 A1 | 5/2003 | Chung et al. | |
| 2005/0213555 A1 | 9/2005 | Eyuboglu et al. | |
| 2005/0243749 A1 | 11/2005 | Mehrabanzad et al. | |
| 2005/0245279 A1 | 11/2005 | Mehrabanzad et al. | |
| 2006/0067422 A1 | 3/2006 | Chung | |
| 2006/0067451 A1 | 3/2006 | Pollman et al. | |
| 2006/0126509 A1 | 6/2006 | Abi-Nassif | |

(Continued)

FOREIGN PATENT DOCUMENTS

GB 2452688 3/2009

OTHER PUBLICATIONS

U.S. Appl. No. 11/387,309, Jul. 2010, Laroia et al.*

(Continued)

*Primary Examiner* — Nay A Maung
*Assistant Examiner* — Angelica M Perez
(74) *Attorney, Agent, or Firm* — Fish & Richardson P.C.

(57) ABSTRACT

Among other things, a method performed by a first access point is described. The method includes outputting signals. At least some of the signals interfere with communication between a device and a second access point. The method also includes determining whether to output the signals in a predefined mode based on dynamically calculated values of a parameter. The parameter is related to signal interference at the device. If it is determined to output the signals in the predefined mode, for a time period, the first access point outputs signals in the predefined mode.

34 Claims, 12 Drawing Sheets

(56) References Cited

U.S. PATENT DOCUMENTS

| | | | |
|---|---|---|---|
| 2006/0159045 A1 | 7/2006 | Ananthaiyer et al. | |
| 2006/0240782 A1 | 10/2006 | Pollman et al. | |
| 2006/0291420 A1 | 12/2006 | Ng | |
| 2006/0294241 A1 | 12/2006 | Cherian et al. | |
| 2007/0026884 A1 | 2/2007 | Rao | |
| 2007/0058628 A1 | 3/2007 | Rao et al. | |
| 2007/0077948 A1 | 4/2007 | Sharma et al. | |
| 2007/0097916 A1 | 5/2007 | Eyuboglu et al. | |
| 2007/0115896 A1 | 5/2007 | To et al. | |
| 2007/0140172 A1 | 6/2007 | Garg et al. | |
| 2007/0140184 A1 | 6/2007 | Garg et al. | |
| 2007/0140185 A1 | 6/2007 | Garg et al. | |
| 2007/0140218 A1 | 6/2007 | Nair et al. | |
| 2007/0155329 A1 | 7/2007 | Mehrabanzad et al. | |
| 2007/0220573 A1 | 9/2007 | Chiussi et al. | |
| 2007/0230419 A1 | 10/2007 | Raman et al. | |
| 2007/0238442 A1 | 10/2007 | Mate et al. | |
| 2007/0238476 A1 | 10/2007 | Sharma et al. | |
| 2007/0242648 A1 | 10/2007 | Garg et al. | |
| 2007/0248042 A1 | 10/2007 | Harikumar et al. | |
| 2008/0003988 A1 | 1/2008 | Richardson | |
| 2008/0013488 A1 | 1/2008 | Garg et al. | |
| 2008/0062925 A1 | 3/2008 | Mate et al. | |
| 2008/0065752 A1 | 3/2008 | Ch'ng et al. | |
| 2008/0069020 A1 | 3/2008 | Richardson | |
| 2008/0069028 A1 | 3/2008 | Richardson | |
| 2008/0076398 A1 | 3/2008 | Mate et al. | |
| 2008/0117842 A1 | 5/2008 | Rao | |
| 2008/0119172 A1 | 5/2008 | Rao et al. | |
| 2008/0120417 A1 | 5/2008 | Harikumar et al. | |
| 2008/0139203 A1 | 6/2008 | Ng et al. | |
| 2008/0146232 A1 | 6/2008 | Knisely | |
| 2008/0151843 A1 | 6/2008 | Valmikam et al. | |
| 2008/0159236 A1 | 7/2008 | Ch'ng et al. | |
| 2008/0161033 A1* | 7/2008 | Borran et al. | 455/522 |
| 2008/0162924 A1 | 7/2008 | Chinitz et al. | |
| 2008/0162926 A1 | 7/2008 | Xiong et al. | |
| 2008/0253550 A1 | 10/2008 | Ch'ng et al. | |
| 2008/0254792 A1 | 10/2008 | Ch'ng | |
| 2009/0034440 A1 | 2/2009 | Samar et al. | |
| 2009/0082020 A1 | 3/2009 | Ch'ng et al. | |
| 2009/0088155 A1 | 4/2009 | Kim | |
| 2009/0116445 A1 | 5/2009 | Samar et al. | |
| 2009/0154447 A1 | 6/2009 | Humblet | |
| 2009/0156165 A1 | 6/2009 | Raghothaman et al. | |
| 2009/0156195 A1 | 6/2009 | Humblet | |
| 2009/0156218 A1 | 6/2009 | Garg et al. | |
| 2009/0163202 A1 | 6/2009 | Humblet et al. | |
| 2009/0163216 A1 | 6/2009 | Hoang et al. | |
| 2009/0163238 A1 | 6/2009 | Rao et al. | |
| 2009/0164547 A1 | 6/2009 | Ch'ng et al. | |
| 2009/0168766 A1 | 7/2009 | Eyuboglu et al. | |
| 2009/0168788 A1 | 7/2009 | Den et al. | |
| 2009/0170440 A1 | 7/2009 | Eyuboglu et al. | |
| 2009/0170475 A1 | 7/2009 | Ch'ng et al. | |
| 2009/0170520 A1 | 7/2009 | Jones | |
| 2009/0170547 A1 | 7/2009 | Raghothaman et al. | |
| 2009/0172169 A1 | 7/2009 | Ramaswamy et al. | |
| 2009/0172397 A1 | 7/2009 | Kim | |
| 2009/0186626 A1 | 7/2009 | Raghothaman et al. | |
| 2011/0081864 A1 | 4/2011 | Srinivas et al. | |

OTHER PUBLICATIONS

3rd Generation Partnership Project 2 "3GPP2", "cdma2000 High Rate Packet Data Interface Specification", C.S0024, version 2, Oct. 27, 2000 (441 pages).

3rd Generation Partnership Project 2 "3GPP2", "cdma2000 High Rate Packet Data Interface Specification", C.S0024-A, version 2, Jul. 2005 (1227 pages).

3rd Generation Partnership Project 2 "3GPP2", "cdma2000 High Rate Packet Data Interface Specification", C.S0024-B, version 1, Apr. 2006 (1623 pages).

3rd Generation Partnership Project 2 "3GPP2", "cdma2000 High Rate Packet Data Interface Specification", C.S0024-B, version 2, Mar. 2007 (1627 pages).

3rd Generation Partnership Project 2 "3GPP2", "cdma2000 High Rate Packet Data Interface Specification", C.S0024, version 4, Oct. 25, 2002 (548 pages).

3rd Generation Partnership Project 2 "3GPP2", "cdma2000 High Rate Packet Data Interface Specification", C.S0024-A, version 1, Mar. 2004 (1083 pages).

Leung, Kin K., et al., "Dynamic Allocation of Downlink and Uplink Resource for Broadband Services in Fixed Wireless Networks", IEEE Journal on Selected Areas in Communications, vol. 17, No. 5, May 1999, pp. 990-1006 (17 pages).

Hanly, Stephen V., "An Algorithm for Combined Cell-Site Selection and Power Control to Maximize Cellular Spread Spectrum Capacity", IEEE Journal on Selected Areas in Communications, vol. 13, No. 7, Sep. 1995, pp. 1332-1340 (9 pages).

Foschini, Gerard J., et al. "A Simple Distributed Autonomous Power Control Algorithm and its Convergence", IEEE Transactions on Vehicular Technology, vol. 42, No. 4, Nov. 1993, pp. 641-646 (6 pages).

Bonald, Thomas, et al., "Inter-Cell Scheduling in Wireless Data Networks", France Telecom R&D, Bell Laboratories, Lucent Technologies (7 pages).

Zander, Jens, "Performace of Optimum Transmitter Power Control in Cellular Radio Systems," IEEE Transactions on Vehicular Technology, vol. 41, No. 1, Feb. 1992, pp. 57-62 (6 pages).

Yates, Roy D., "A Framework for Uplink Power Control in Cellular Radio Systems", IEEE Journal on Selected Areas in Communications, vol. 13, No. 7, Sep. 1995, pp. 1341-1347 (7 pages).

Rasti, Mehdi, et al., "Improved Distributed Power Control Algorithms with Gradual Removal in Wireless Networks," Department of Electrical and Computer Engineering, Tarbiat Modares University, Tehran, Iran, Aug. 11, 2009 (5 pages).

Rasti, Medi, et al., "A Distributed and Efficient Power Control Algorithm for Wireless Networks", Department of Electrical and Computer Engineering, Tarbiat Modares University, Tehran, Iran, Aug. 11, 2009 (6 pages).

Tiedemann, Ed, "CDMA Technology Roadmap: CDG NARC", Qualcomm, San Diego, Nov. 20, 2008, Microsoft Power Point presentation (7 pages).

Necker, Marc C., "Local Interference Coordination in Cellular OFDMA Networks", Institute of Communication Networks and Computer Engineering, University of Stuttgart, Germany, 2007, pp. 1741-1746 (6 pages).

Bedekar, A., et al., "Downlink Scheduling in CDMA Data Networks", Probability, Networks and Algorithms (PNA), PNA-R9910 Oct. 31, 1999 (34 pages).

Mailaender, Laurence, et al., "Simple Inter-Cell Coordination Schemes for a High Speed CDMA Packet Downlink", Bell Labs, Lucent Technologies, Holmdel, New Jersey, 0-7803-571, IEEE 2000, downloaded Mar. 11, 2009, pp. 1845-1848 (4 pages).

Ahmed, Mohamed H. et al., "Interference management using basestation coordination in broadband wireless access networks", Wireless Communications and Mobile Computing, Wirel. Commun. Mob. Comput. 2006; 6:95-103, published online Jan. 9, 2006 in Wiley InterScience (www.interscience.wiley.com), DOI: 10.1002/wcm.266, pp. 95-103 (9 pages).

Fong, Thomas K., et al., "Radio Resource Allocation in Fixed Broadband Wireless Networks", AT&T Laboratories—Research, Apr. 8, 1997, revised Dec. 31, 1997 (33 pages).

U.S. Appl. No. 09/976,240, filed Oct. 12, 2001, will be U.S. Patent No. 7,603,127, issued Oct. 13, 2009, application (30 pages).

* cited by examiner

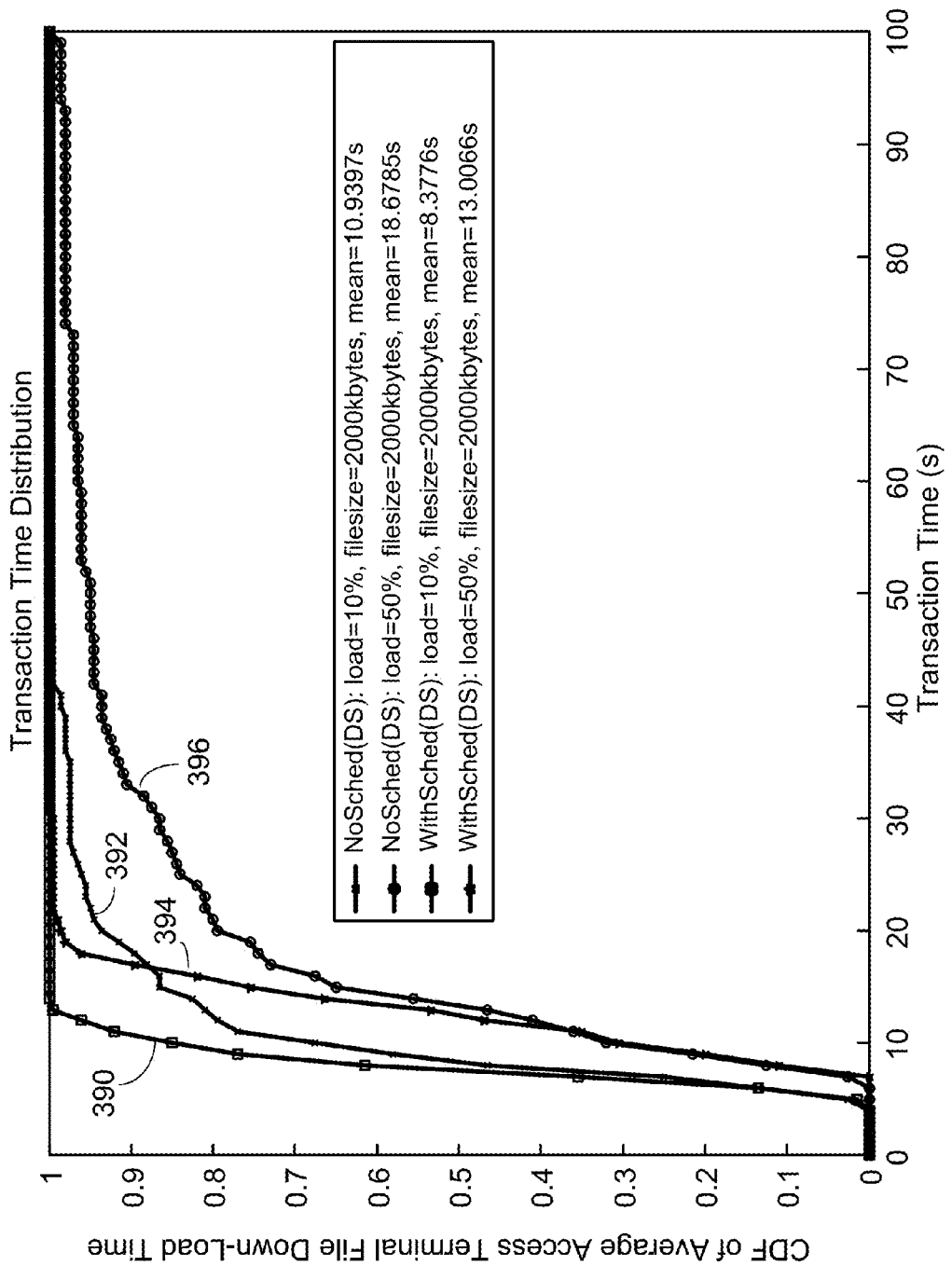

MITIGATING INTERFERENCE USING COOPERATIVE SCHEDULING

TECHNICAL FIELD

This patent application relates to mitigating interference between two or more access points.

BACKGROUND

When connecting to a radio network, an access terminal selects an access point from available radio network access points that are within communication range. Network protocols are used in communicating between an access point and the access terminal.

The 1×RTT protocol has been standardized by the Telecommunication Industry Association (TIA) in the TIA-2000.1 through TIA-2000.6 series of specifications, which are incorporated herein by reference.

The 1×EV-DO protocol has been standardized by the TIA as TIA/EIA/IS-856, "CDMA2000 High Rate Packet Data Air Interface Specification," 3GPP2 C.S0024-0, Version 4.0, Oct. 25, 2002, which is incorporated herein by reference. Revision A to this specification has been published as TIA/EIA/IS-856A, "CDMA2000 High Rate Packet Data Air Interface Specification," 3GPP2 C.S0024-A, Version 2.0, July 2005. Revision A is also incorporated herein by reference. Revision B to this specification has been published as TIA/EIA/IS-8560B, 3GPP2 C.S0024-B, version 1.0, April 2006, and is also incorporated herein by reference. Other wireless communication protocols, such as UMTS (Universal Mobile Telecommunications Service), may also be used.

SUMMARY

Generally, in one aspect, a method performed by a first access point is described. The method comprises outputting signals, at least some of the signals interfering with communication between a device and a second access point, determining whether to output the signals in a predefined mode based on dynamically calculated values of a parameter, the parameter relating to signal interference at the device, and if it is determined to output the signals in the predefined mode, for a time period, outputting signals from the first access point in the predefined mode.

Implementations may include one or more of the following features. The signals are turned on and off periodically in the predefined mode. A request is received from the second access point to enter the predefined mode. The request is received from the second access point, the request being based on signal-to-noise ratios of signals received at the device. The signal-to-noise ratios comprise a first signal-to-noise ratio of a signal received from the first access point by the device, and a second signal-to-noise ratio of another signal received from the second access point by the device. A value of the parameter is calculated as a function of data representing communications associated with the first and second access points. The function includes the lowest throughput of all throughputs of all communication associated with the first and second access points. The function includes a sum of all throughputs of all communication associated with the first and second access points. A first value of the parameter is calculated without having the first access point enter the predefined mode and a second value assuming the first access point being in the predefined mode. The first and second values are compared for the determining. Whether the second access point is in a second predefined mode prior to the first access point outputting the signals in the predefined mode is determined. The predefined mode of the first access point is coordinated with the second predefined mode of the second access point. At least some of the signals output by the first access point are synchronized to some signals output by the second access point for establishing the coordination of the predefined modes. The second predefined mode comprises turning signals sent from the second access point on and off periodically, and the predefined mode of the first access point comprises turning the signals sent from the first access point off when the signals from the second access point are on and turning the signals sent from the first access point on when the signals from the second access point are off. A length of the time period is predetermined to be about 1 second to about 5 seconds and the first access point exits the predefined mode after the time period.

Generally, in another aspect, a machine readable medium for storing instructions that are executable by a first access point is described. The execution of the instructions by the first access point causes the first access point to: output signals, at least some of the signals interfering with communication between a device and a second access point, determine whether to output the signals in a predefined mode based on dynamically calculated values of a parameter, the parameter relating to signal interference at the device, and if it is determined to output the signals in the predefined mode, for a time period, output signals from the first access point in the predefined mode.

Implementations may include one or more of the following features. Execution of the instructions by the first access point causes the first access point to turn the signals on and off periodically in the predefined mode. Execution of the instructions by the first access point causes the first access point to calculate a value of the parameter as a function of data representing communications associated with the first and the second access points. The function includes a lowest throughput of all throughputs of all communication associated with the first and second access points or a sum of all throughputs of all communication associated with the first and second access points. Execution of the instructions by the first access point causes the first access point to calculate a first value of the parameter without having the first access point enter the predefined mode and a second value assuming the first access point being in the predefined mode. The first and second values are compared for the determining. Execution of the instructions by the first access point causes the first access point to determine whether the second access point is in a second predefined mode prior to the first access point outputting the signals in the predefined mode. Execution of the instructions by the first access point causes the first access point to coordinate the predefined mode of the first access point with the second predefined mode of the second access point. Execution of the instructions by the first access point causes the first access point to receive a request to enter the predefined mode from the second access point. The request is received from the second access point, the request being based on signal-to-noise ratios of signals received at the device.

Generally, in another aspect, an apparatus comprises a first access point capable of outputting signals, at least some of the signals interfering with communication between a device and a second access point. The first access point determines whether to output the signals in a predefined mode based on dynamically calculated values of a parameter. The parameter is related to signal interference at the device. If it is determined to output the signals in the predefined mode, for a time period, the first access point outputs signals in the predefined mode.

Implementations may include one or more of the following features. The first access point turns the signals on and off periodically in the predefined mode. The first access point calculates a value of the parameter to be a lowest throughput or a sum of all throughputs of all communication associated with the first and second access points.

Generally, in another aspect, a system comprises a first access point capable of outputting signals and a second access point in communication with a device, at least some of the signals interfering with the communication. The first access point determines whether to output the signals in a predefined mode based on dynamically calculated values of a parameter. The parameter is related to signal interference at the device. If it is determined to output the signals in the predefined mode, for a time period, the first access point outputs signals in the predefined mode.

Implementations may include one or more of the following features. The first access point turns the signals on and off periodically in the predefined mode. The second access point neglects a communication request from the device during a time slot each time when the signals are turned off.

The details of one or more examples are set forth in the accompanying drawings and the description below. Further features, aspects, and advantages will be apparent from the description, drawings, and the claims.

DESCRIPTION OF DRAWINGS

FIG. 9B is a plot of a transaction time distribution.

DETAILED DESCRIPTION

Figure 1:
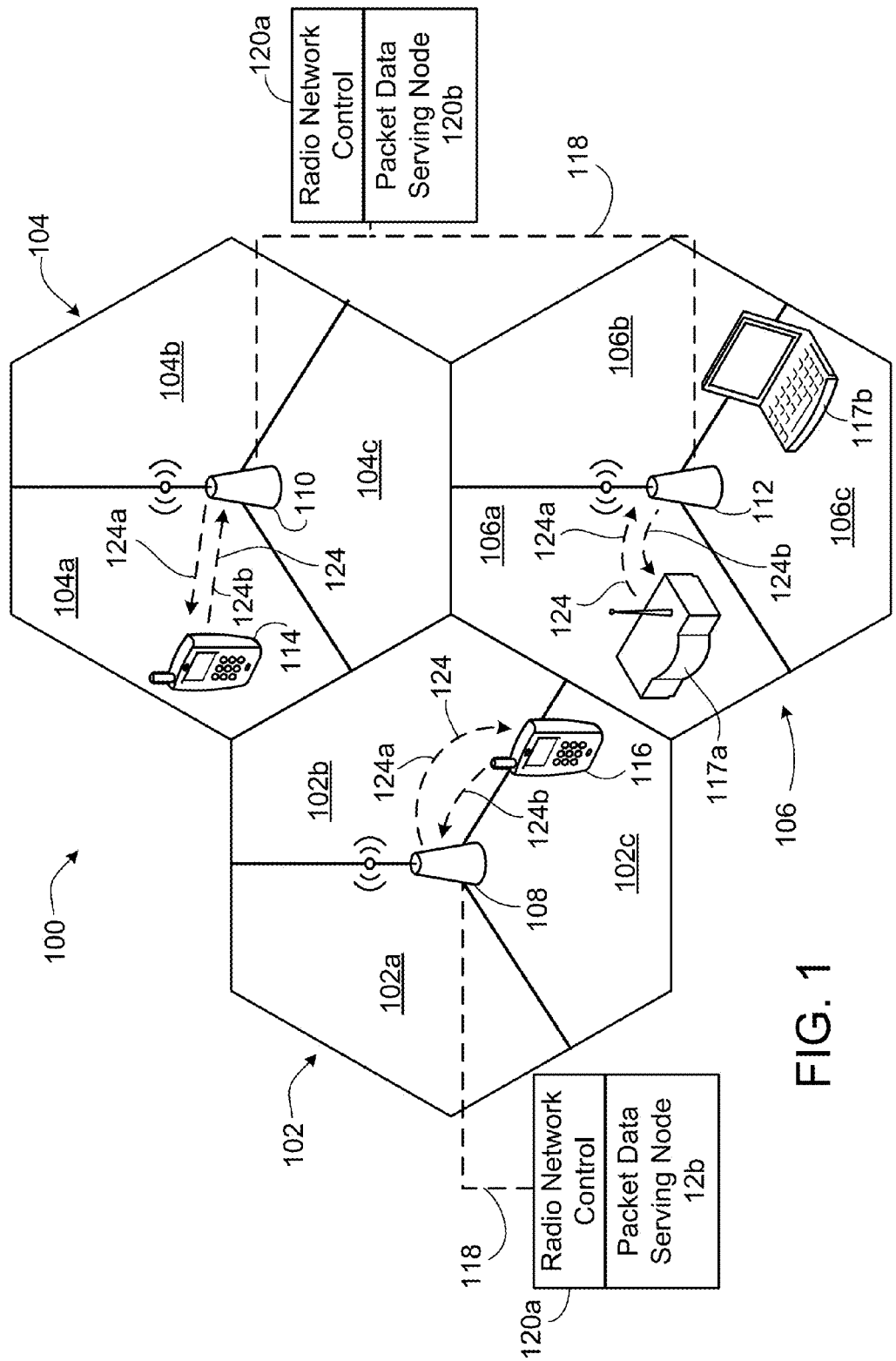
FIG. 1 is a block diagram of a network.

Referring to FIG. 1, cellular wireless communications systems, such as radio access network (RAN) 100, are designed to serve access terminals distributed in a geographic area by dividing the area into cells. At or near the center of each cell 102, 104, 106, a radio network access point, also referred to as a macro base transceiver station (BTS) 108, 110, 112, is located to serve access terminals 114, 116 (e.g., cellular telephones, laptops, PDAs). Each cell 102 may be further divided into sectors 102a-c, 104a-c, 106a-c by using sectorized antennas. A BTS 108 corresponding to a cell 102 serves one or more sectors 102a to 102c and communicates with multiple access terminals 114 within the cell 102.

RAN 100 uses the 1×EV-DO protocol to transmit data packets between an access terminal, e.g., access terminal 114, 116, and a macro BTS, e.g., BTSs 108, 110, 112. The BTSs 108 may be connected over a backhaul connection 118 to radio network controller/packet data serving nodes (RNC/PDSN) 120a-b, which may include one or more physical devices at different locations. Although this description uses terminology from EV-DO standards, the same concepts are applicable to other communication standards, including 1×RTT, GSM, UMTS, HSDPA, WiMax or WiBro.

The access terminals, such as access terminal 114, may be single-user devices, such as a cellular telephones and PDAs, or multiple-user devices, such as routers 117a that allow single-user devices, such as laptops 117b, to connect to the access terminals through local links (not shown).

Functions of the BTS and the radio network controller (RNC) may be combined into a single device; functions of the PDSN and the radio network control (RNC) may be combined into a single device; and functions of the BTS, the RNC and the PDSN may be combined into the same device. The single device can be, for example, a femtocell.

The implementations described herein are independent of the above combinations and the benefits apply to all combinations. References in this description to a radio access network (RAN) 100 taking action or being acted upon generally refer to a radio network control (RNC) 120a or a radio network control (RNC) 120a in combination with other devices.

Access terminals, such as access terminal 114, may be in communication with a BTS, such as BTS 108, through an air link 124. The air link 124 may include a forward link 124a (also referred to as a downlink), which carries data from a BTS 108 to an access terminal 114, and a reverse link 124b (also referred to as an uplink), which carries data from the access terminal 114 to the BTS 108.

Figure 2:
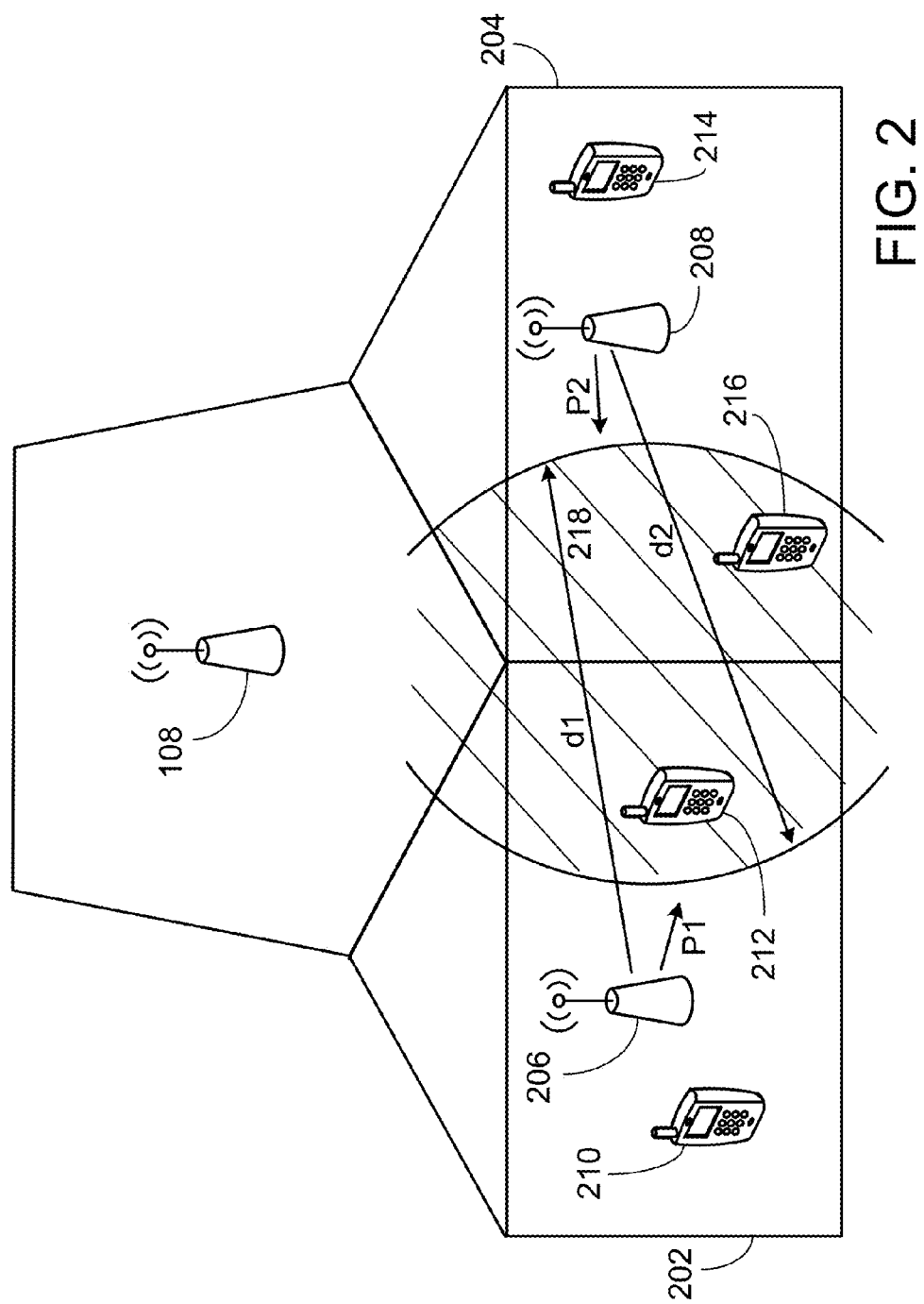
FIGS. 2, 6, 8, and 10 are block diagrams of access point deployments.

Referring to FIG. 2, two neighboring homes 202, 204 each has an access point 206, 208 (which may be a femtocell or another type of private access point) deployed in a manner similar to a WiFi® access point. The access points 206, 208 may be configured in a manner similar to a BTS. For example, the access point 206, 208 may include both a transmitter and a receiver configured to receive signals at different sub-bands. The access points 206, 208 can communicate with other networks, e.g., the Internet (not shown) to enable access terminals 210, 212 (in the home 202) and 214, 216 (in the home 204) to communicate with other devices (e.g., devices in a cellular network or Internet). The access terminals can communicate with the macro BTS 108 when they are not located in connection range relative to respective access points, for example, when the access terminals are outside of the homes 202, 204. Access points can also be installed in offices, public spaces, or restaurants. The references in this description to an access point being in a "home" also include such locations.

The strength and the rate of the signals delivered from an access point can decrease as its distance from the access point increases. Access terminals located at a distance larger than a threshold distance away from the access point receive no signal or signals with very weak strength at a low rate from the access point. For example, the access terminals 210, 212 are located within a radius $d_1$ (threshold distance) from the access point 206 and can receive signals at a desired data rate from the access points 206. The access terminals 214, 216 are located within a radius $d_2$ (threshold distance) from the access point 208 and can receive signals at a desired data rate from the access points 206. In some implementations, the access points 206, 208 are deployed closely (e.g., in neighboring apartments on the same floor or on the neighboring floors) so that the radii $d_1$ and $d_2$ overlap in a interfering region 218 (shaded area) between the access points. Access terminals located within the interfering region 218 can receive signals from both access terminals 206, 208. Some of the received signals are undesired and interfere with other desired signals. For example, the access terminal 212 communicating with the access point 206 is capable of receiving undesired signals from the access point 208. The access terminal 216 communicating with the access point 208 is capable of receiving undesired signals from the access point 206. The interference resulting from the undesired signals can be dynamically controlled based on the protocol used for the communication among the access points and the access terminals. Mitigation of the interference can improve the downlink throughput of an entire system (in the example shown in FIG. 2, all access terminals connected to the access points 206, 208) and/or the data rate of data transfer at particular access terminals.

In some implementations, the access points communicate with the access terminals using the EVDO protocol. Each EVDO signal transmitted by a BTS or a femtocell include a known pilot signal and is scrambled using a pseudo noise sequence. The pseudo noise sequence is periodic and pseudo noise sequences used by different BTSs are identical. Nearby BTSs or femtocells align the pseudo noise sequences in a unique way with respect to universal time (e.g. UTC) to these BTSs. The alignment is called the pseudo noise (PN) offset of the BTSs. A BTS can be locally identified (among the nearby BTSs) based on its PN offset. The PN offset of a BTS can be determined by an access terminal by detecting the pilot signal sent from the BTS.

Normally, the access points 206, 208 each sends out a pilot signal $p_1$, $p_2$ periodically and synchronously at a full power strength P. In the example shown in FIG. 2, the access terminal 210 or the access terminal 214 outside of the interfering region 218 receives only the pilot signal $p_1$ or the pilot signal $p_2$. The access terminals 212, 216 within the interfering region 218 receive both pilot signals $p_1$, $p_2$.

Generally, the strength of the signals decreases as the travel distance of the signals increases. Sometimes, when the signals pass blocking media, e.g., walls of the homes 202, 204, the strength of the signals are lost even more. Generally, the strength of a signal is represented by a power of the signal. The total loss in power strength of the signals between the access terminals and the access points is referred to as path loss. A parameter, channel gain G, which is calculated as the multiplicative inverse of the linear value of path loss, is usually used to indicate the path loss. The strength of the signals received by the access terminals is represented by PG, which is a combination of the power (P) used for delivering the signals and channel gain (G). For simplicity, the power of the both the desired and undesired signals received at the access terminals is assumed to be at the same power PG (assuming an equal channel gain G between the access terminals 212, 216 and the access points 206, 208).

Upon receiving the pilot signals, an access terminal can evaluate the pilot signal-to-noise ratio (SNR) from the access point with which it is communicating. This pilot SNR is defined to be the power ratio between the received power of the pilot signal transmitted by the access point to which it is connected and the sum of the received power of interfering signals plus noise (see also, equation (1) below). If data needs to be transferred or is being transferred, the access terminal (transferring the data or to which the data is transferred) sends a data rate control (DRC) request, which is based on the pilot SNR calculated most recently, to the access point with which the access terminal communicates. The DRC request requests the access point to transfer data or to continue transferring data at a requested data rate that is specified in the DRC request. The requested data rate is generally an increasing function of the most recent pilot SNR. The actual data rate transmitted by the access point can be at most equal to the requested data rate from the access point. The pilot SNR can be calculated as:

$$SNR = \frac{E_c}{I_0} = \frac{\text{signal power from the "right" access point}}{\Sigma \text{ interfering signals} + \text{background noise}} \quad (1)$$

where "right" means the particular access point with which the access terminal is supposed to communicate (e.g., the access point 206 for the access terminal 212 or the access point 208 for the access terminal 216). In some implementations, equation (1) can also be used for calculating an SNR for data signals (data SNR). All interfering access points are delivering the pilot signals simultaneously. Therefore, in calculating the pilot SNR, the pilot interfering signals always exist and are at the largest value. However, it is possible that not all interfering access points are delivering the data signals. Accordingly, in calculating the data SNR, some of the interfering data signals may not exist and the total interfering data signals are no larger than the total interfering pilot signals. The data SNR is at least as large as the corresponding pilot SNR specified in the DRC request for the data transfer.

In normal situations, the access point 206 communicates with the access terminals 210, 212 independently of communication between the access point 208 and the access terminals 214, 216. The pilot SNR at each access terminal 210, 212, 216, 214 based on the received pilot signals is (assuming that each pilot signal is received with strength PG):

$$\left(\frac{E_c}{I_0}\right)_{210 \text{ or } 214} = \frac{PG}{0 + N_0} \gg 1; \quad (2)$$

$$\left(\frac{E_c}{I_0}\right)_{212 \text{ or } 216} = \frac{PG}{PG + N_0} \approx 1. \quad (3)$$

where $N_0$ is the background noise and is a positive number and 0 in equation (2) represents no interfering pilot signals. Generally, when the access points are densely deployed, we can assume that both the received signal power and the interference power is far greater than the background noise, i.e., $PG \gg N_0$, thus yielding the results of the far right-hand sides of equations (2) and (3). The access terminals 210, 214, when free of interference, each has a larger pilot SNR than the pilot SNR of the access terminal 212, 216 within the interfering region 218. As a result, data is transferred at a higher rate between the access terminal 210 and the access point 206 than between the access terminal 212 and the access point 206. The interference between the access points 206, 208 causes low throughput in communication between the access terminal 212 and the access point 206.

To increase the rate of data transfer between the access point 206 and the access terminal 212, the access point 208 can be instructed (e.g., via a request) to operate in a scheduled mode (SM) that is different from a normal operational mode for a predetermined time period $T_{total}$. During the SM, the power of the access point 208 is intermittently (e.g., periodically) turned up (e.g., to its full power P) and down (e.g., to a fraction of the full power P). In some implementations, the power is turned off to zero during the "down" time. For simplicity, we discuss the situations in which the power of the access point 208 is turned on and off intermittently. The discussion can be readily generalized. When the power is on, the access point 208 delivers signals, e.g., pilot signals and data signals, as it does in its normal mode. When the power is off, no signals are delivered. During the SM, the access terminal 212 obtains a relatively high pilot SNR and has data transferred to/from the access point 206 at a relatively high data rate.

Figure 3A:
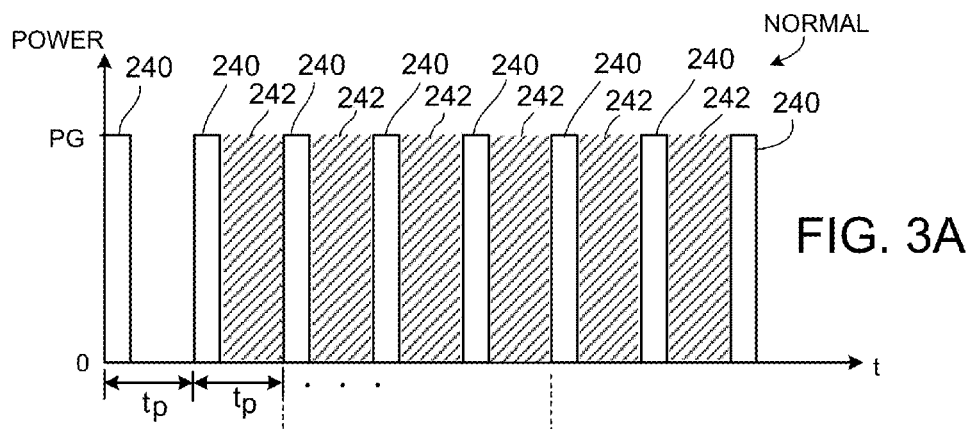
FIGS. 3A and 3C are diagrams of signals sent from access points using an EVDO protocol.
Figure 3B:
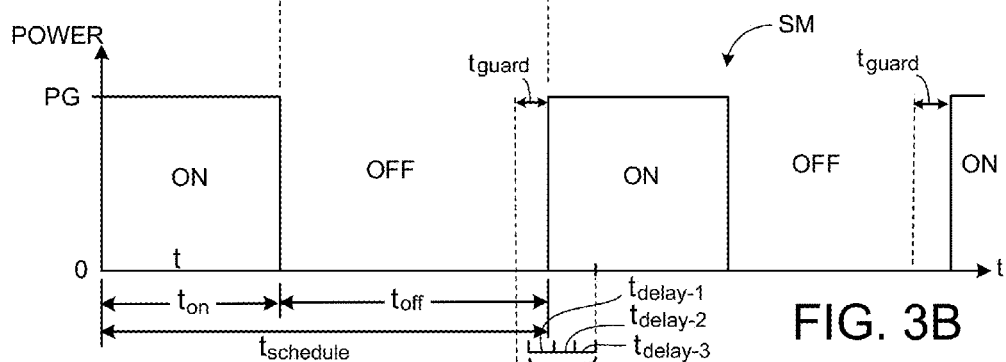
FIGS. 3B, 3D, 4B, 4D, 7A, 7B, and 7C are scheduled modes for controlling the power of access points.

In the example shown in FIGS. 3A and 3B, in a normal mode, the access point 208 has its power on constantly and sends out a pilot signal 240 during each EVDO half-slot $t_p$ at a full power strength P. The value for $t_p$ can be about 0.8 ms. In addition, upon receiving data transfer requests, e.g., from the access terminals 214, 216, data signals 242, 244, 246, 248, 250 are sent, e.g., at the full power strength P or lower. In this case, the access terminal 212 has a low pilot SNR because it receives all of the pilot signals 240 and the data signals 242-250 from the interfering access point 208. The low pilot SNR leads to a low DRC request, and therefore, a low data rate for transferring data to/from the access point 206.

The access point 206 can determine whether to request the access point 208 to enter the SM based on knowledge of the interference at the access terminal 212. The access point 206 can use the received interfering pilot signal strengths to compute whether having the interfering access point 208 enter SM can improve the rate of data transfer between the access point 206 and the access terminal 212.

If the SM request is sent and the access point 208 enters the SM, the power of the access point 208 is turned on for a time period $t_{on}$ and off for another time period $t_{off}$. The on/off may be periodic or intermittent (e.g., at non-regular intervals). When the total time $T_{total}$ for the SM is up, the access point 208 returns to operate in the normal mode. The period $t_{schedule}$ is the sum of $t_{on}$ and $t_{off}$, and, together with the other parameters $t_{on}$, $t_{off}$, and $T_{total}$, can be predetermined and programmed into the access point. Generally, both the on and off times $t_{on}$, $t_{off}$, are chosen to be equal to or larger than $t_p$. If the power of the access point 208 is only turned off so that no data signals 242-250 are delivered, the pilot signals 240 still interfere with the pilot signals from the access point 206. Thus while the access terminal 212 might obtain some incremental gain due to a higher data SNR (e.g., the number of required HARQ retransmissions may be lower), the pilot SNR of the access terminal 212 remains low and the data rate requested by the DRC is also low. In some implementations, $t_{on}$ and $t_{off}$ are integer multiples of $t_p$, and can be on the order of a tens to hundreds of the value of the half slot length $t_p$. $t_{on}$ and $t_{off}$ can be the same or can be different. $t_{schedule}$ can be on the order of tens to a few thousand half-slots.

During on time of the access point 208, the data transfer between the access point 206 and the access terminal is performed in the normal mode as if the access point 208 were not in the SM. When the access terminal 212 receives a first pilot signal from the access point 206 after the access point 208 is turned off, the calculated pilot SNR is high. Data can be transferred between the access point 206 and the access terminal 212 at a high rate. The data transfer returns to the normal mode as the access point 208 is turned on after $t_{off}$ is up and the pilot SNR at the terminal 212 becomes low.

Figure 3C:
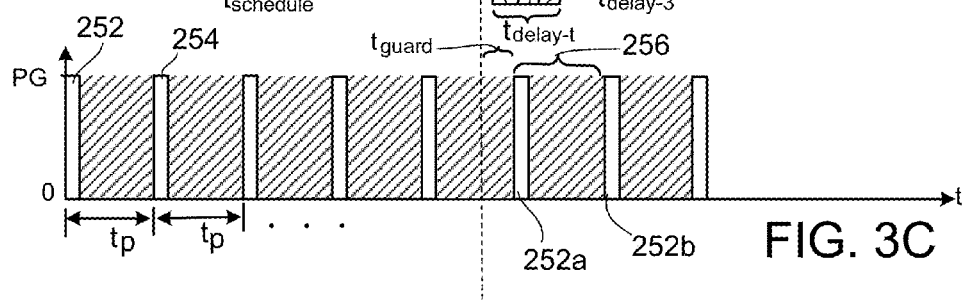

While the access point 208 is in the SM of FIG. 3B, referring to FIG. 3C, the access point 206 sends out pilot signals 252 synchronously with the pilot signals 240 (FIG. 3A) and data signals 254 (if requested). The last pilot signal 252a sent by the access point 206 prior to the power of the access point 208 being turned on is received by the access terminal 212 after a time delay $t_{delay-1}$. The pilot SNR calculated by access terminal 212 is high ($SNR_{high}$) and the $SNR_{high}$ and a DRC request are sent back to the access point 206 after another time delay $t_{delay-2}$. The access point 206 may respond to the request and send out the data after an additional time delay $t_{delay-3}$. The time delays can be caused by the communication time between the devices. In some implementations, the time delay $t_{delay-3}$ is minimal, e.g., practically zero. The total delay $t_{delay-t}$ (which can be the sum of $t_{delay-1}$, $t_{delay-2}$ and $t_{delay-3}$) before the access point 206 starts transferring the data at the requested rate can be on the order of a one or more half slots $t_p$.

In some implementations, the access point 208 is turned on before the total delay $t_{delay-t}$ is over. The access point 206 is going send data to the access terminal 212 at a high rate based on the $SNR_{high}$ while the access point 208 is already turned on in a time period 256. The actual data SNR at the access terminal 212 may be low ($SNR_{low}$) if access point 208 is transmitting data to any of its access terminals. The data rate sent from the access point 206 is therefore too high given the low $SNR_{low}$ at the access terminal 212. In particular, during the time period 256, data is transferred at a higher rate between the access point 206 and the access terminal 212 than it should have been because of the turned-on interference of the access point 208 during this time period. The access point 206 may recognize this situation as an error and terminate the data transfer early.

In some implementations, a guard time period $t_{guard}$ is scheduled just prior to the access point 208 being turned on. During the guard time period $t_{guard}$, the access point 206 neglects the DRC request from the access terminal 212 and waits for the next DRC request after $t_{guard}$ is over and the power of the access point 208 is turned on. Upon receiving the next pilot signal 252b, the access terminal 212 calculates an $SNR_{low}$ and sends a DRC request to the access point 206, specifying a data rate based on the $SNR_{low}$. The possible error explained previously can be avoided. The guard time period $t_{guard}$ can be chosen to be larger than the total delay $t_{delay-t}$ and can be on the order of one or more half slots $t_p$. The access point 206 can be programmed to include a $t_{guard}$ each time when the power of the access point 208 is switched from off to on in the SM.

The total SM duration $T_{total}$ can be preselected or dynamically determined based on the amount of data being transferred between the access point 206 and access terminal 212. The dynamic scheduling of $T_{total}$ can enable the system to work at a high efficiency. For example, the access point 208 is not locked in the SM for a time period longer than the total time for the data transfer. $T_{total}$ can be chosen such that the access point 208 stays in the SM, e.g., for as long as the time to complete the data transfer without interference. In some implementations, because data traffic can be bursty and unpredicatable, a preselected value for $T_{total}$ that is short enough to apply to most data transfer sizes, yet long enough so as not to cause excess network traffic due to SM re-requests can be used. When $T_{total}$ is up, the access point 208 resumes its normal mode (e.g., the mode shown in FIG. 3A). If the data transfer between the access point 206 and the access terminal 212 continues, the access point 206 has to re-request the access point 208 to enter the SM.

In some implementations, a short total SM time period $T_{total}$ can be predetermined to reduce an amount of communication required for determining the $T_{total}$ dynamically. In some examples, $T_{total}$ can be on the order of about hundreds of half slots $t_p$ to about several tens of thousands of half-slots $t_p$. For tasks that need time longer than $T_{total}$ for the data transfer, the access point 206 has to re-request the access point 208 to enter SM again after $T_{total}$ is up.

$T_{total}$ and $t_{off}$ are also selected so that the access terminals 214, 216 do not start reselecting access points for communication. During the power off time, $t_{off}$, of the access point 208, the access terminals 214, 216 cannot receive signals from the access point 208. The access terminals 214, 216 may also have low communication quality with the access point 208 when the access point 208 is turned on/off during the entire SM. An access terminal can be in an idle mode, e.g., having its power on and being connected to an access point, but not transferring data, or in an active mode, e.g., transferring data with the access point. In either mode, the access terminal may decide that the connection to the access point is lost after receiving no signal or low quality signals for a time period. The time period can be very short, e.g., immediately for an idle mode access terminal, or a few hundred milliseconds for an active mode access terminal. After recognizing the loss of connection, the access terminal may start searching for other access points (e.g., access point 206 or other access points in the area, or even the macro BTS 108) and communicating with the other access points.

In some implementations, an access point learns about nearby access points and broadcasts a neighborlist of access points that are nearby and possibly available for establishing connections to the access terminals connected to the access point. For example, access point 208 may broadcast a neighborlist to the access terminal 216 which may include the access point 206 or the macro BTS 108. In some implementations, to prevent access terminals from re-registering with other access points during the SM, one or more listed access points can be removed from the neighborlist. Then the access terminal is not able to search for other access points using the neighborlist.

In some implementations, with or without the neighborlist, the access terminal can search for other access point based on a pilot-increment, which is a predetermined positive integer. During the search, the access terminal looks for access points with PN offsets that are integer multiples of the pilot-increment. A value of the pilot-increment can be chosen such that the pilot PN-offset indices of nearby access points are not integer multiples of the value.

While the access point 208 may enter the SM to reduce effects of interference on communication between the access terminal 212 and the access point 206, the access point 208 may also request the access point 206 to enter an SM (for clarity, we label it as SM'). Interference with communication between the access terminal 216 and the access point 208 from the access point 206 may also need to be mitigated. In some implementations, the access terminal 216 needs to transfer, or is transferring, data to/from the access point 208 and detects interference from the access point 206. The access terminal 206 may enter the SM' upon the request of the access point 208 to facilitate the data transfer between the access point 208 and the access terminal 216. The features, e.g., $T_{total}'$, $t_{on}'$, $t_{off}'$, $t_{schedule}'$, $t_{guard}'$ (the prime "'" is added for labeling, and the symbols have the same meaning as those without the prime) and others, of the SM' of the access point 206 can be similar to the features of the SM of the access point 208. In addition, when the access point 208 is already in the SM, the SM' and the SM are coordinated. For example, the power of the access point 206 is off when the power of the access point 208 is on, and vice versa.

Figure 3D:
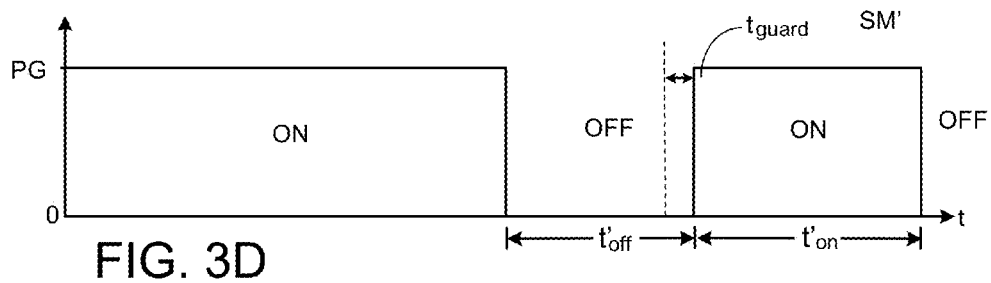

In the examples shown in FIGS. 3B and 3D, in the coordinated SM and SM', the period $t_{schedule}'$ equals the period $t_{schedule}$, the on time period $t_{on}'$ equals the off time period $t_{off}$, and the off time period $t_{off}'$ equals the on time period $t_{on}$. The system can have a high efficiency with such a coordination. To build the coordination, the access points 206, 208 use the synchronous feature of the pilot signals. In particular, after deciding to enter the SM' and knowing that the access point 208 is in the SM, the access point 206 waits for one $t_{schedule}$ of the access point 208. The access point 206 detects the on/off pattern of the SM of the access point 208 during the waiting period. The access point 206 then starts the SM' in the next period by turning off the power at the same time when the access point 208 turns the power on, e.g., based on the synchronous pilot signals used in EVDO. The on/off pattern of the SM' coordinates with the pattern of the SM in a complementary manner.

Figure 4A:
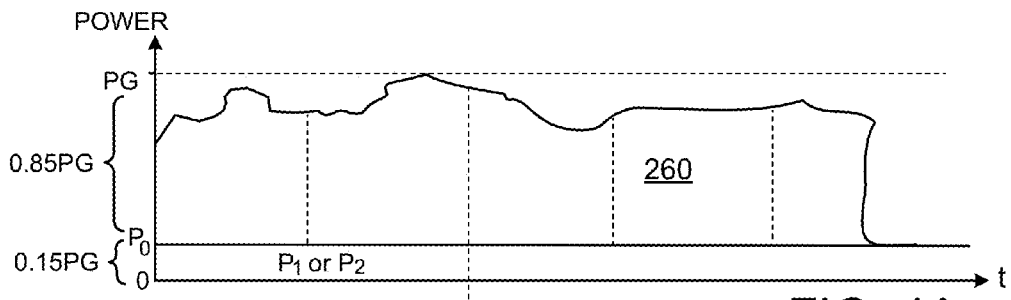
FIG. 4A is a diagram of signals sent from an access point using a HSDPA protocol.

The access points can also communicate with the access terminals using the HSDPA protocol. Like in 1x RTT and 1x EV-DO, the HSDPA access points also transmit scrambled signals that include a pilot. However, the transmission of the signals from different access points are not synchronized and each BTS uses a locally different scrambling code that identifies itself from other BTSs. Referring to FIGS. 2 and 4A, in the normal mode, the access points 206, 208 send out constant pilot signals $p_1$, $p_2$ at a power $p_0$, e.g., about 10% to about 20% of the full power strength P. Different access points can be programmed to use the same or different power strength(s) $p_0$ for the pilot signals. In some implementations, an individual access point can change the power strength used for sending the pilot signals. When data needs to be transferred, data signals 260 are sent together with the constant pilot signals $p_1$, $p_2$. The combined power strength for the data signal and the pilot signal at any time t is no greater than the full power strength P.

The access point 206, 208 can transfer data to the connected access terminals at any data rate (unlike EVDO), but this data rate is typically informed by the access terminal's pilot SNR similar to EVDO. Specifically, the access terminal send back "channel quality indicators" (CQIs) to the access point; these CQIs serve a similar purpose to DRC requests.

In calculating the data SNR representing the received data rate using equation (1), the signal power from the "right" access point used for the calculation is the power for the data signal ([P−$p_0$]G) from the "right" access point. The interfering signals include, for example, the pilot signals and the data signals from the interfering access point. In the examples shown in FIGS. 2 and 4A, the access points 206, 208 each sends out pilot signals at a strength of 0.15 P and data signals at a strength of 0.85 P, and the access terminals 212, 216 in the interfering region 218 receive signals at their delivery strength, assuming equal channel gains G The data SNRs at the access terminals 212, 216 are (assuming that the background noise $N_0 \ll PG$):

$$SNR_{212,216} = \left(\frac{E_c}{I_0}\right) \qquad (4)$$

$$= \frac{0.85PG}{0.15PG + 0.85PG + N_0}$$

$$\approx -0.7 \text{ dB} \Rightarrow 1.29 \text{ Mbps};$$

The computed data rate at the right hand side of equation (4) is based on a typical data rate transmitted to a category 10 HSDPA access terminal. In another example, when data is being transferred between the access point 206 and the access terminal 212, no data transfer takes place between the access point 208 and the access terminal 216. The data SNR at the access terminal 212 is:

$$SNR_{212} = \frac{1}{2}\left[\left(\frac{E_c}{I_0}\right)_{AP208data\ off} + \left(\frac{E_c}{I_0}\right)_{AP208data\ on}\right] \qquad (5)$$

$$= \left(\frac{0.85PG}{0.15PG + 0PG + N_0} - 0.7\text{dB}\right)$$

$$\approx 6.8 \text{ dB} \Rightarrow 3.72 \text{ Mbps}/2$$

$$= 1.86 \text{ Mbps};$$

where the co-efficient ½ represents that transfer of the data signals from the access point 208 is turned on and off for an equal amount of time in the SM. 0 PG means no interfering data signals from the access point 208 are received at the access terminal 212, and the value of the term ($E_c/I_0$)$_{AP\ 208\ data\ on}$ is the same as the value of equation (4). Comparing the two examples, without the interfering data signals (0 PG), even if there is still interfering pilot signals (0.15 PG), the SNR at the access terminal 212 increases.

Figure 4B:
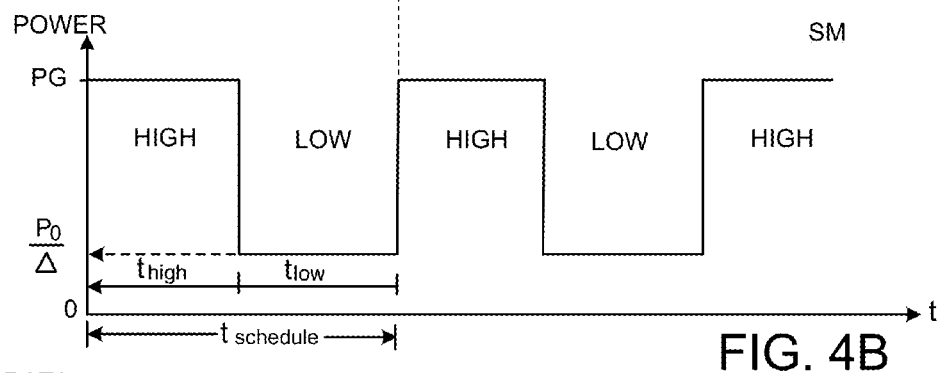

Referring to FIGS. 2 and 4B, the access point 206 can request the access point 208 to enter an SM mode in which the power of the access point 208 is turned periodically to be high (e.g., full power PG) for a time period $t_{high}$ and to be low for a time period $t_{low}$. $t_{high}$ and $t_{low}$ can have features similar to those of $t_{on}$ and $t_{off}$ of FIG. 3B. The period $t_{schedule}$ is the sum of $t_{high}$ and $t_{low}$. The low power of the access point 208 can be $p_0/\Delta_{lin}$, where $\Delta_{lin}$ is a positive number no less than 1. At low power, the access point 208 sends no data signals and sends the pilot signals at a power that is $1/\Delta_{lin}$ of the power $p_0$, at which the pilot signals are send in the normal mode. The data SNR at the access terminal 212 is:

$$SNR_{212,SM} = \left(\frac{E_c}{I_0}\right) = \frac{0.85 PG}{\frac{0.15 PG}{\Delta_{lin}} + 0 PG + N_0} \approx (7.5 + \Delta_{dB}) \text{ dB} \quad (6)$$

where $N_0 \ll PG$ and $\Delta_{dB}$ is the decibel value of $\Delta_{lin}$, i.e., $\Delta_{dB} = 10 \log(\Delta_{lin})$. When $\Delta_{lin}$ is 1 and the power for the pilot signals is $p_0$, equation (6) is the same as equation (5). In some implementations, when no data is being transferred between the access point 208 and the access terminal 214, 216, the access point 208 can remain in its normal mode because the SNR at the access terminal 212 is sufficiently high. Having the access point 208 enter the SM with $\Delta_{lin}$ being 1 does not make a difference to the SNR. When $\Delta_{lin}$ is larger than 1, the power of the pilot signals from the access point 208 is lower than $p_0$ during $t_{low}$ and even the interference from the pilot signals is reduced. When $\Delta$ is infinite, the power for the pilot signals from the access point 208 is off during $t_{low}$ and the SM of FIG. 4B becomes the same as the SM of FIG. 3B. During the power off time, the SNR at the access terminal 212 can reach the highest possible value. In some implementations, even if no data is being transferred between the access point 208 and the access terminal 214, 216, the access point 208 enters the SM with $\Delta_{lin} > 1$ to reduce the interference from the pilot signals of the access point 208.

Other features associated with the SM of FIG. 4B, e.g., the total duration $T_{total}$, can be similar to the features of the SM of FIG. 3B. Methods as previously described to prevent the access terminals to re-select access points can also be used. In addition, when the access points and access terminals are using the HSDPA protocol, the access terminal usually waits for a time period $T_{reselect}$ after deciding that connection has been lost before starting searching for new connections. $T_{reselect}$ may be pre-determined and programmed in each access terminal. To prevent reselection, $T_{total}$ and $t_{low}$ can be chosen in consideration of the reselecting time $t_{reselect}$ of the access terminals 214, 216. For example, $t_{low}$ can be smaller than $T_{reselect}$. $t_{guard}$ may also be used. In some implementations, the access point 206 can be notified of the SM of the access point 208. It may not be necessary to apply $t_{guard}$ because the access point 206 can adjust the rate at which data is sent to the access terminal when the power of the access point 208 is turned from low to high.

In some implementations, the access point 208 in the SM may request the access point 206 to enter an SM' for the data transfer between the access terminal 216 and the access point 206. Similar to the situations described for the EVDO protocol, the SM' can have similar features to the SM of the access point 208 and can coordinate with the SM. In the example shown in FIGS. 4B and 4D, the power of the access point 206 at high for a time period $t_{high}'$ when the access point 208 is in low power during the time period $t_{low}$, and vice versa.

Figure 4C:
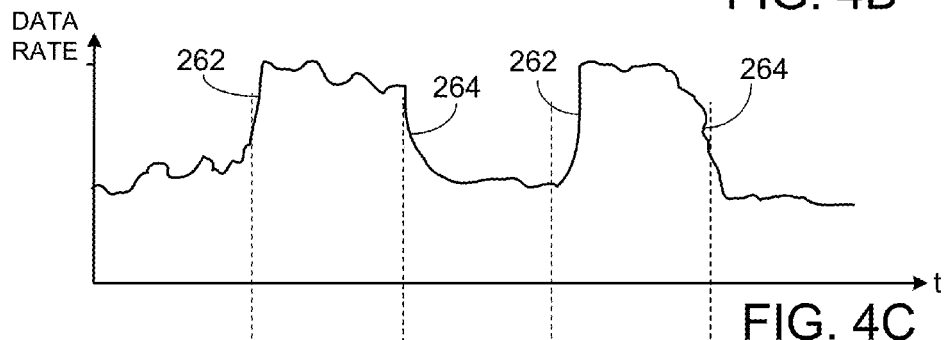
FIG. 4C is a diagram of received data rate at an access terminal.
Figure 4D:
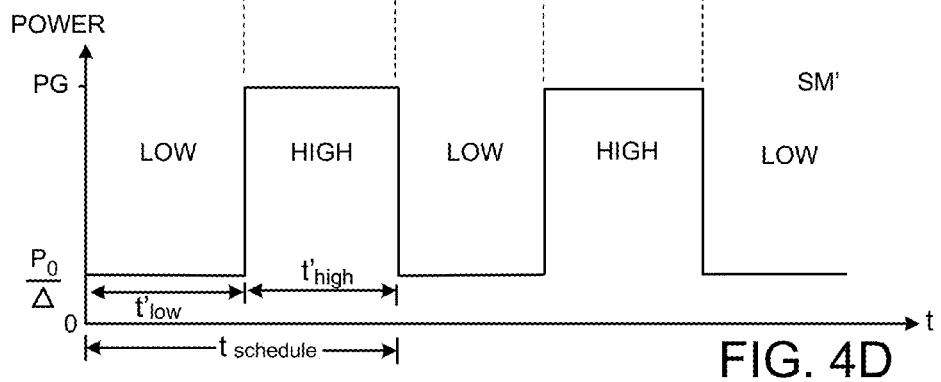

To establish the coordination between the SM and the SM', in some implementations, the access point 206 obtains information about the received pilot SNR, e.g., channel quality indicator (CQI), from the access terminal 212 for a period of time. As shown in FIGS. 4B and 4C, the received data rate (or CQI) rises each time 262 when the access point 208 enters the low power mode, and drops each time 264 when the access point 208 enters the high power mode. Accordingly, in the SM', the access point 206 enters the high power mode each time 262 when the data rate rises and enters the low power mode each time 264 when the data rate drops. Other method can also be used. For example, signals delivered from the access points 206, 208 can be synchronized. In some implementations, the synchronization can be global (with all access points) and can be established using, e.g., GPS. A constant local synchronization can be also established among nearby access points, e.g. using the IEEE 1588 or other local synchronization algorithms. In some implementations, an on-demand pair-wise synchronization can be used. Upon receiving a time-stamped SM request(s) from the access point 208, the access point 206 synchronizes to access point 208's timing. Specifically, access point 208 becomes a time server to the access point 206, for example, in a manner similar to the way the network time protocol (NTP) works. The access point 206 then enters the SM' at the next starting point of $t_{high}$ or $t_{low}$ (FIG. 4B) in coordination with the SM.

Referring again to FIG. 2, additional access points (not shown) and access terminals (not shown) can be located nearby, e.g., in another neighboring home (not shown). Additional interference with the communication between the access terminals 210-214 and the access points 206, 208 can be caused. In some implementations, one access point may receive more than one request to enter an SM. The access point may enter one SM and neglect all other request during the $T_{total}$ of the SM.

The access point 206, 208 sends out SM requests to one or more of the other access points after determining that data transfer with one or more connected access terminals is interfered by the one or more access points. The determination includes an initiation process from the access terminal and an evaluation process from the access point. In the initiation process, the access terminal 212 calculates an SNR associated with each access point based on the pilot signals (in the EVDO protocol) or the combined pilot and data signals (in the HSDPA protocol) received from each access point. For example, using equation (1), the access terminal 212 calculates an $SNR_1$ (pilot SNR in the EVDO protocol and data SNR in the HSDPA protocol) for signals received from the connected access terminal 206 and an $SNR_2$ for signals received from the interfering access terminal 208. Here, the "right" access point is the access point for which the SNR is calculated. In some implementations, the data SNR in the HSDPA protocol is calculated as the pilot SNR multiplied by a constant. Using the parameters set in the earlier examples, where the path gains between the access points and the access terminals are all equal to 0 or to G, the $SNR_1$ and $SNR_2$ at the access terminal 212 for the EVDO protocol are:

$$(SNR_1)_{EVDO} = (SNR_2)_{EVDO} = \left(\frac{E_c}{I_0}\right)_{212} = \frac{PG}{PG + N_0}. \quad (7)$$

The $SNR_1$ and $SNR_2$ for the HSDPA protocol are (assuming both access points 206, 208 are delivering data signals):

$$(SNR_1)_{HSDPA} = (SNR_2)_{HSDPA} = \left(\frac{E_c}{I_0}\right)_{212} = \frac{0.85PG}{PG + N_0}. \quad (8)$$

The access terminal 212 then sends the calculated $SNR_1$ and $SNR_2$ to the access point 206. In some implementations, the access terminal 212 automatically calculates these SNRs and sends them to the connected access point 206. In some implementations, the access point 206 requests, e.g., periodically, the access terminal 212 to perform the calculations and report the results of the calculations. The access point 206 learns about signatures of the pilot signals (e.g., PN-offset or scrambling code) of the nearby interfering access points, e.g., by communicating with these access points.

The access point 206 can use the received interfering pilot signal strengths to compute whether having the interfering access point 208 enter SM can improve the rate of data transfer between the access point 206 and the access terminal 212. In some implementations, a requested data rate corresponds to a range of pilot SNR. Although the access terminal 212 can obtain an improved pilot SNR after the access terminal 208 enters the SM, the improvement may not be sufficient to lead to a better data rate. In situations like this, the access point 206 may determine not to request the access terminal 208 to enter the SM. If the access point 206 determines that the access point 208 should enter the SM, messages carrying the request to enter an SM from one access point to another access point can be sent in various ways. For example, the access points can communicate via a central entity, such as an auto-configuration server (ACS) or a femtocell service manager (FSM). In another example, direct communication over a private or public internet can be used. Discussion of communication between access points is described in U.S. patent application Ser. No. 12/347,511, filed Dec. 31, 2008, the entire content of which is incorporated here by reference.

Although having the access point 208 enter the SM facilitates the communication between the access point 206 and the access terminal 212, the communication between the access point 208 and the access terminals 214, 216 may be adversely affected. For example, during the time period $t_{off}$ or $t_{low}$, no data signals are sent by the access point 206 or can be received by the access terminals 214, 216. In other words, a throughput for the communication of the access terminal 212 may increase, but the throughputs for the communication of the access terminals 214, 216 may decrease. In some implementations, the access point 206, 208 only accepts the request to enter the SM when a value of a scheduled mode throughput metrics (SMTM) increases. To calculate the SMTM, the message from the access point 206 that requests the access point 208 also includes parameters, such as the calculated SNRs, the calculated rates of data transfer that can be achieved for the access terminal 212 if the access terminal 208 enters the SM.

The SMTM can be a sum of all throughputs for all devices in the system, e.g., access terminals 212-216. The SMTM can also be the lowest throughput of all devices, the combination of the sum and the lowest throughput, e.g., weighted or unweighted sum, a general function of the SNRs and throughputs, or others. Upon receiving the SM request, the access point, e.g., the access point 208, calculates two values for the SMTM. A first value, $SMTM_{current}$, is calculated for all access terminals in the entire system when the access points are in their current operational mode (e.g., the normal mode or the SM). A second value, $SMTM_{SM}$, is calculated for all access terminals with the access point 208 being hypothetically in the SM. By comparing the calculated $SMTM_{current}$ and $SMTM_{SM}$, the access point 208 determines whether to enter the requested SM. If $SMTM_{current}$ is larger, the access point 208 rejects the request to enter SM and all access terminals and access points continue to operate in their current mode. This can happen, for example, when having the access point 208 enter the SM reduces the total throughput of the entire system, causes a particular access terminal to have a throughput lower than the currently lowest throughput in the system. If $SMTM_{SM}$ is larger, the access point 208 enters the SM and the throughput of the entire system or one or more particular access terminals are increased.

Figure 5:
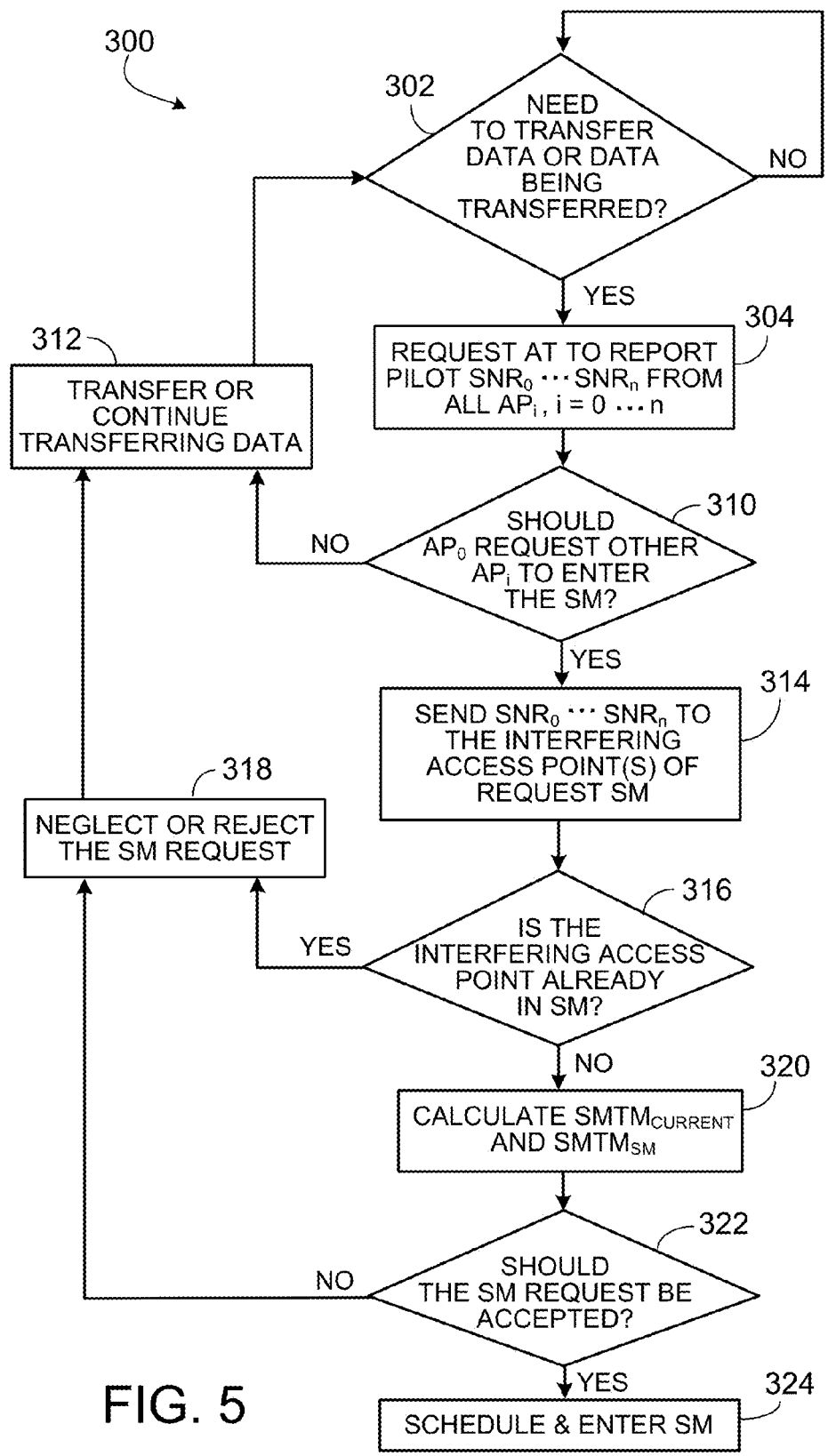
FIG. 5 is a flow chart.

A dynamic process 300 for mitigating interference among access points is shown in FIG. 5. For illustration purposes, it is assumed that an access terminal (AT) is connected to an access point ($AP_0$) and is located in a region that signals from interfering access points ($AP_1, \ldots, AP_n$, where n is a positive integer) can reach. Each access point is in a current operational mode (e.g., the normal mode or the SM). Initially, the AT determines (302) whether data needs to be transferred or is being transferred to/from the $AP_0$. If no, the AT waits and returns to the step 302. If yes, the $AP_0$ requests (304) the AT to calculate $SNR_0, SNR_1, \ldots, SNR_n$ for each signals received by the AT and delivered from the $AP_0$ and $AP_1, \ldots, AP_n$ and report the calculated $SNR_0, SNR_1, \ldots, SNR_n$ to the $AP_0$. The $AP_0$ then determines (310) whether requests should be sent to the other access points to ask those access points to enter SMs. If no, the $AP_0$ transfers or continues to transfer (312) the data to the AT and the AT returns to the step 302. If yes, the $AP_0$ sends (314) an SM request with the $SNR_0, SNR_1, \ldots, SNR_n$ to each access point $AP_1, \ldots, AP_n$. Each $AP_i$ (i=1, \ldots, n) checks (316) whether itself is already operating in an SM. If yes, the $AP_i$ neglects (318) the SM request. The $AP_0$ transfers or continues to transfer (312) the data to the AT and the AT returns to the step 302. If no, the $AP_i$ calculates (320) the $SMTM_{current}$ and the $SMTM_{SM}$ and determines (322) whether the SM request should be accepted based on comparison of the $SMTM_{current}$ and the $SMTM_{SM}$. If no, the $AP_i$ rejects (318) the SM request. The $AP_0$ transfers or continues to transfer (312) the data to the AT and the AT returns to the step 302. If yes, the $AP_1$ schedules and enters (324) the SM.

Figure 6:
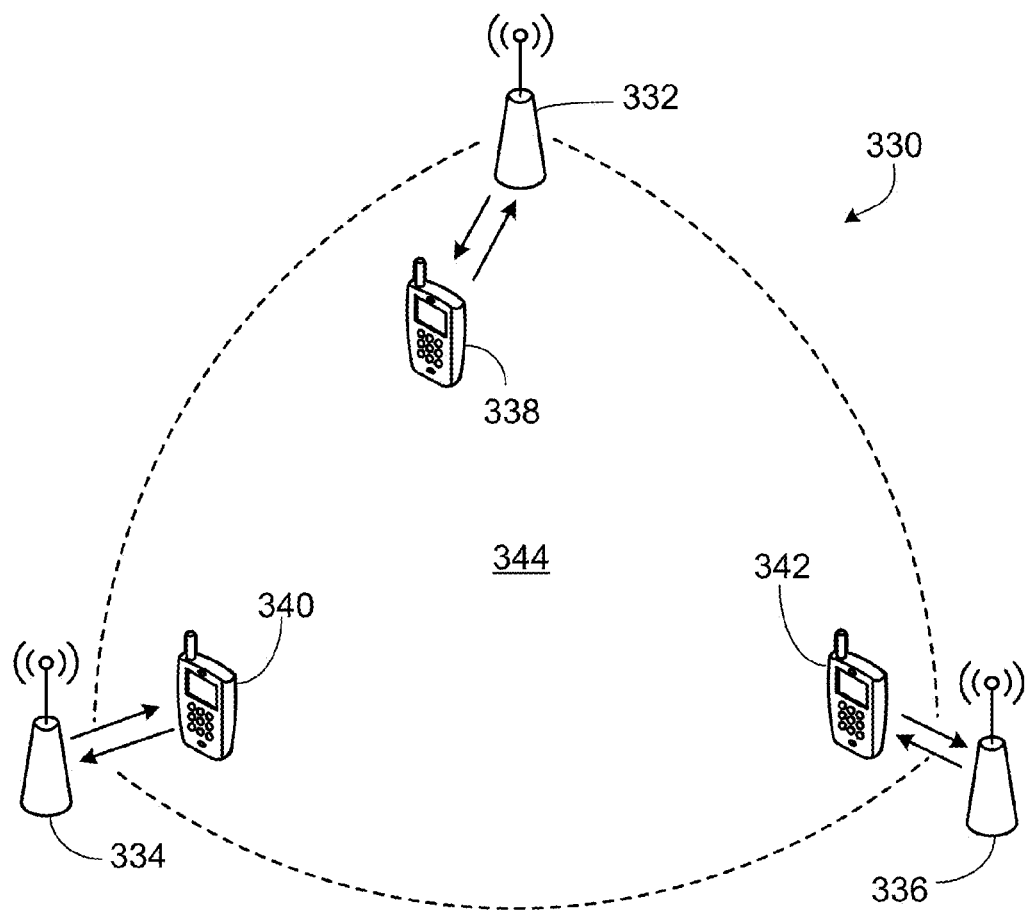
Figure 7A:
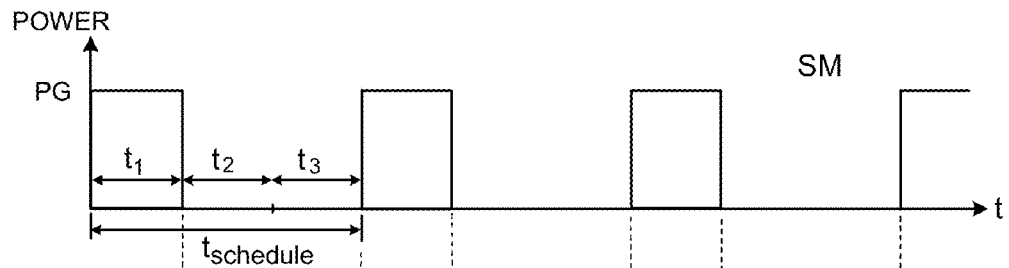
Figure 7B:
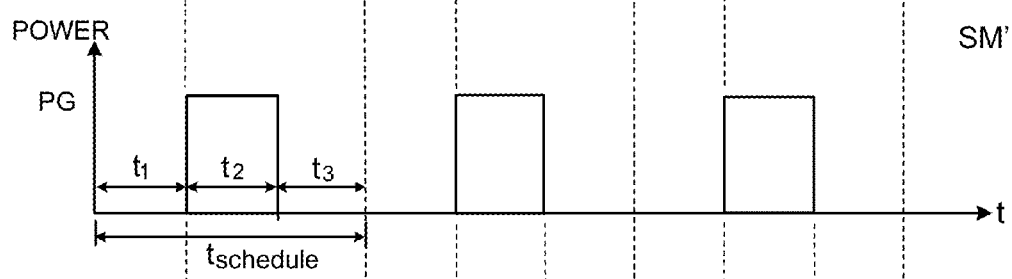

In some implementations, an access point can respond to two or more SM requests and three or more access points can enter coordinated SMs. Referring to FIG. 6, a system 330 includes three access points 332, 334, 336, each similar to the access point 206, 208 of FIG. 2, that are arranged, e.g., in three neighboring homes (not shown). The three access points create an interfering region 344 in which access terminals 338 (connected to the access point 332), 340 (connected to the access point 334), 342 (connected to the access point 336) each is capable of receiving signals from all three access points. In some implementations, the access point 334 is in an SM (e.g., of FIG. 3B or FIG. 4B) upon a request of the access point 332. Later, the access point 332 enters an SM' (e.g., of FIG. 3D or FIG. 4D) upon a request of the access point 334 or the access point 336. When the access point 336 enters an SM" upon a request from the access point 332 or the access point 334, the access points 332, 334 adjust the SM, SM' to have the schedule shown in FIGS. 7A and 7B, respectively.

Figure 7C:
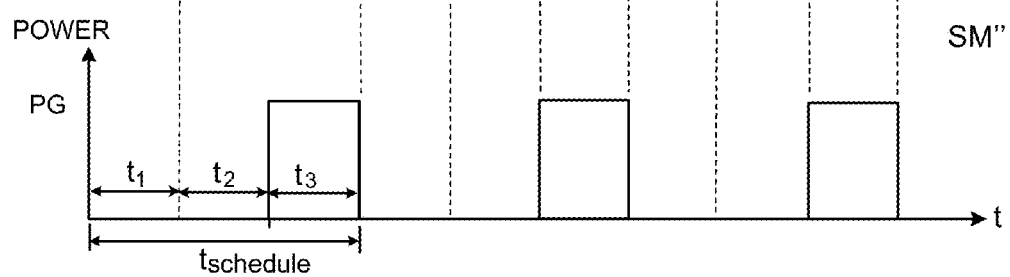

The access point 336 enters the SM" coordinated with SM and SM', and having the schedule shown in FIG. 7C. The period $t_{schedule}$ is divided, e.g., equally, into three time slots $t_1$, $t_2$, and $t_3$ and each access point has the power on or at high (not shown for the HSDPA protocol) in one time slot and off or at low in the other two time slots. The three SMs are coordinated such that in any time slot $t_1$, $t_2$, and $t_3$, there is one and only one access point having it power on or at high. Such an arrangement enables each access terminal to have minimal interference for a third of the transferring time. Other formats of coordination can also be used. The coordination among three SMs can be generalized to coordination among four or even more SMs.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device such as a computer-readable storage medium, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Actions associated with the techniques described herein can be performed by one or more programmable processors executing a computer program to perform functions described herein by operating on input data and generating output. Actions associated with the techniques can also be performed by, and apparatus for implementing the techniques can include, e.g., special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

Components of different embodiments described herein may be combined to form other embodiments not specifically set forth above. Any features described herein may be combined with features found in U.S. patent application Ser. No. 11/958,975, the contents of which are incorporated by reference.

Other embodiments not specifically described herein are also within the scope of the following claims.

EXAMPLES

Example 1

Figure 8:
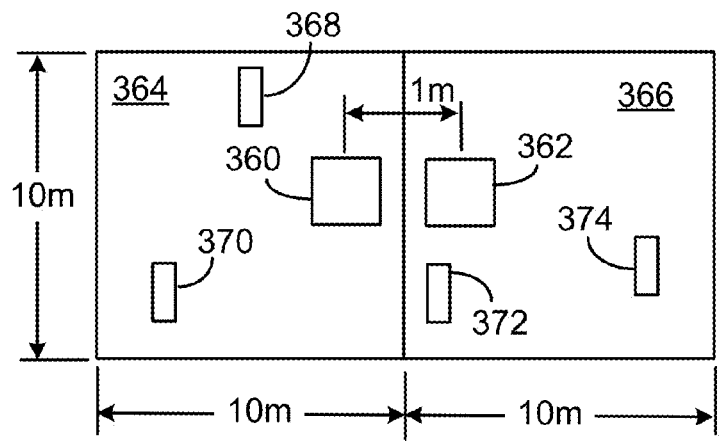

In this illustrative example, mitigation of interference between two femtocells are simulated. Referring to FIG. 8, the scenario includes two femtocells 360, 362 deployed in two neighboring apartments 364, 366 separated by a wall and being 1 meter apart. Each apartment 364, 366 is a cubic having dimensions of 10 m by 10 m by 10 m. Each femtocell 360, 362 communicates using the EVDO protocol with two access terminals 368, 370, or access terminals 372, 374 that are randomly distributed in each apartment. The path loss L over a distance d between the femtocells and access terminals is set to be:

$$L=38.46 \text{ dB}+20 \text{ dB}\times\log d+(\text{number of walls})\times 5 \text{ dB}, \quad (9)$$

where the number of walls refers to the number of walls between the communicating femtocell and access point. The sizes of the files transferred between the access points and the access terminals are log normally distributed with a mean of about 2 Mbytes and a standard deviation of about 0.7 Mbytes. During each simulation, each access terminal goes through the following sequence of actions: (1) wait some random amount of time, (2) download a file that has a size of a random length (but the average size of all files is about 2 MB), and (3) repeat (1)-(2) for a given amount of time. The given amount of time is chosen to be 2000 seconds. The waiting time in (1) is exponentially distributed with means adjusted for different loading fractions of the access terminal. If a file takes on average 2 seconds to download (without the application of the SM), then the waiting time should be on average 18 seconds, in order to ensure a 10% load or 2 seconds for a 50% load. The term load, as used herein, mean that the fraction of time used for actual data transfer (not waiting) in the total amount of time (for waiting and downloading). For the SM, $t_{schedule}$ is chosen to be 160 ms, $t_{on}$ and $t_{off}$ each is 80 ms, and $T_{total}$ is set to be 1.6 s. The SMTM is selected to be the total throughput of the system. In one type of simulation (type I), the femtocells 360, 362 always function in the normal modes. In another type of simulation (type II), the femtocells 360, 362 dynamically mitigates the interference by entering and exiting the SM, if needed. For each type of the simulation, the load is set to be 10% and 50% and a total of four simulations are performed. In each simulation, the two access terminals are randomly placed within each apartment.

Figure 9A:
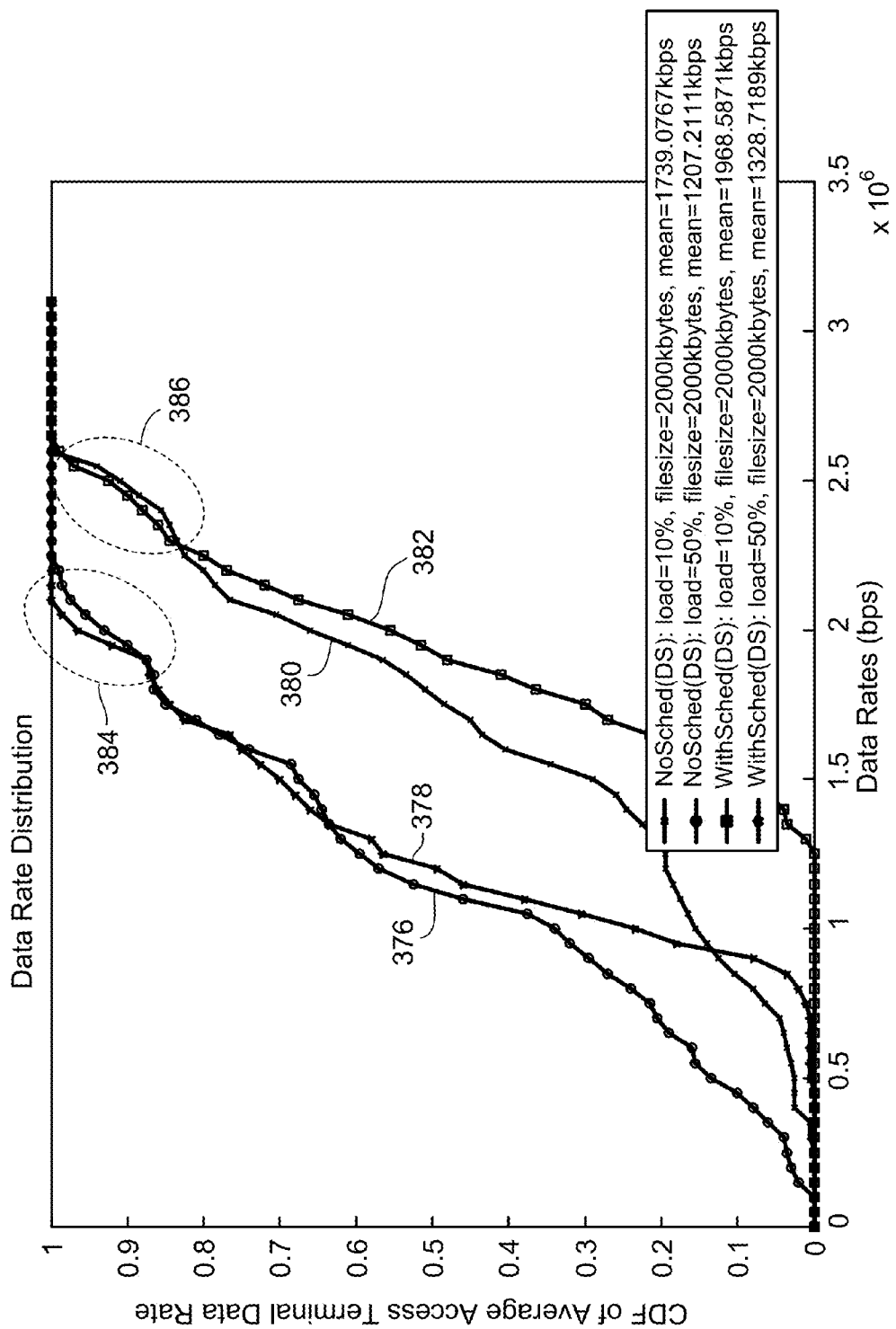
FIGS. 9A, 11A, and 11B are plots of data rate distributions.

The results of the simulations are shown in FIGS. 9A and 9B. In FIG. 9A, curves 382, 380 represent the data rate distribution of the type II simulations and the type I simulations under the condition of the load being 10%, respectively. The horizontal axis represents the data rate and the vertical axis represents the cumulative distribution function (CDF) of average access terminal data rate. Curves 378, 376 represent the data rate distribution of the type II simulations and the type I simulations under the condition of the load being 50%, respectively. When the load is 10%, more than 80% of access terminals 268-274 (in four simulations) transfer data at a higher rate in the type II simulation than in the type I simulation. When the load is 50%, more than 60% of the data is transferred at a higher rate in the type II simulation than in the type I simulation. At a high data rate, under both load conditions, about 10% to about 20% of the access terminals 268-274 (in four simulations) transfer data at a higher rate in the type I simulation than in the type II simulation (e.g., in regions

384, 386 of the curves). On average, each access terminal transfers data at a higher rate in the type II simulation than in the type I simulation.

In FIG. 9B, curves 390, 392 represent the transaction time distribution of the type II simulation and the type I simulation under the condition of the load being 10%, respectively. The horizontal axis represents the transaction time and the vertical axis represents the CDF of average access terminal file download time. Curves 394, 396 represent the transaction time distribution of the type II simulation and the type I simulation under the condition of the load being 50%, respectively. In both load conditions, almost all access terminals transfer data faster in the type II simulation than in the type I simulation. On average, each access terminal transfers data about 20% to about 40% faster in the type II simulation than in the type I simulation. By dynamically scheduling the femtocells 360, 362 to enter the SM, the interference between the femtocells is mitigated.

Example 2

In this illustrative example, mitigation of interference among three femtocells are simulated. In addition to the setting of the system shown in FIG. 8, referring to FIG. 10, a third femtocell 402 is placed in a third apartment 400. The apartment 400 is located linearly relative to the other two apartments 364, 366 and next to the apartment 366. The femtocell 402 is 10 m apart from the femtocell 362 and 11 m from the femtocell 360. Two access terminals 404, 406 in the apartment 400 are connected to the femtocell 402. The same four simulations as those performed in Example 1 are done, using the same parameters as those used in Example 1.

Figure 11A:
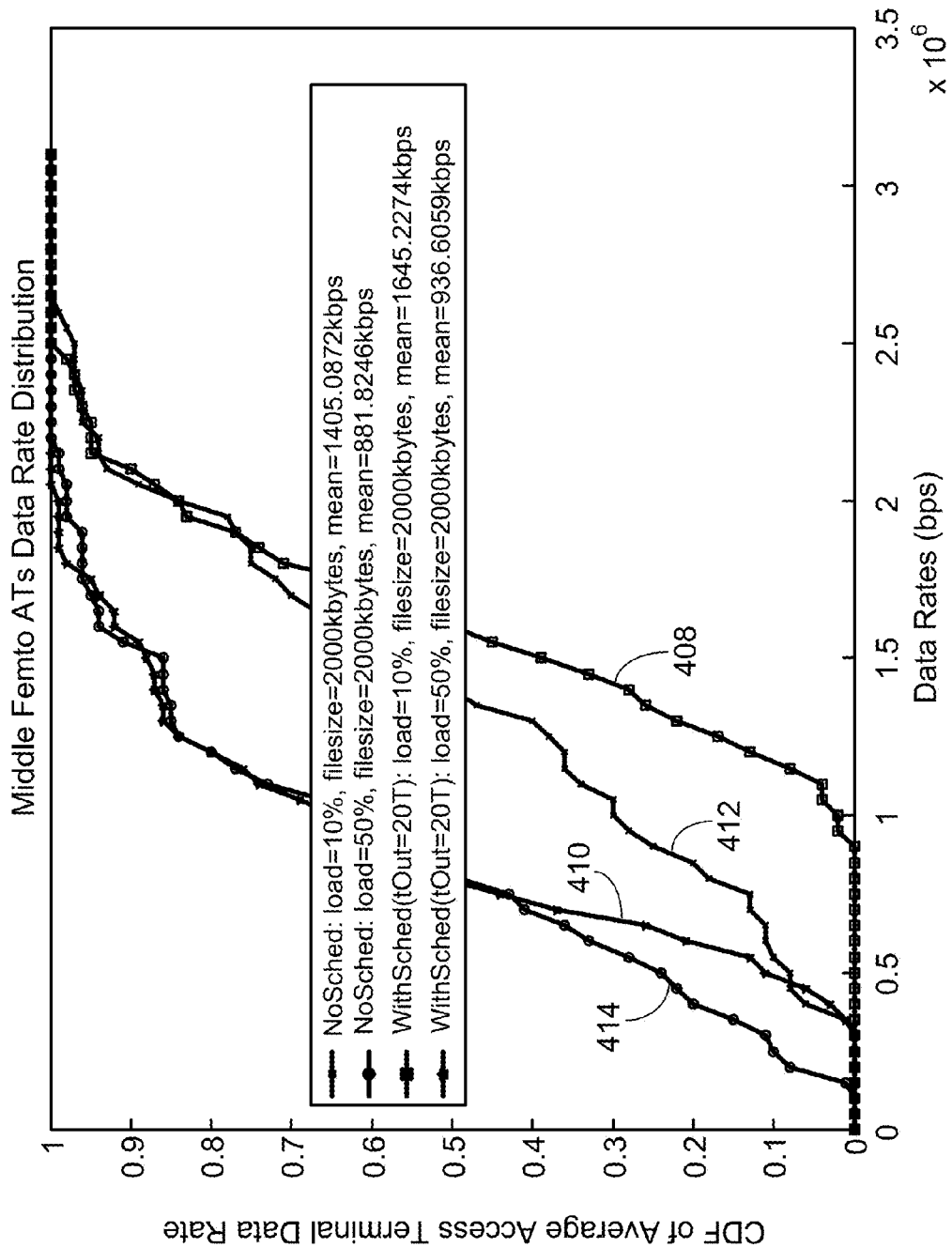

Compared to the other access terminals in the system, the access terminals 372, 374 in the middle apartment 366 are affected the most by interference from both femtocells 360, 402. FIG. 11A shows the data rate distribution for the access terminals 372, 374. The axes of FIG. 11A correspond to the axes of FIG. 9A. In particular, the curves 408, 412 represent the data rate distribution of the type II simulation and the type I simulation under the condition of the load being 10%, respectively. Curves 410, 414 represent the data rate distribution of the type II simulation and the type I simulation under the condition of the load being 50%. More than 40% to more than 70% of access terminals transferring data at a low data rate in the type I simulation transfer data at a higher data rate in the type II simulation under both load conditions. Also, on average, each access terminal transfers data at a higher data rate in the type II simulation than in the type I simulation. The dynamic scheduling of SM improves the data transfer in the middle apartment 366.

Figure 10:
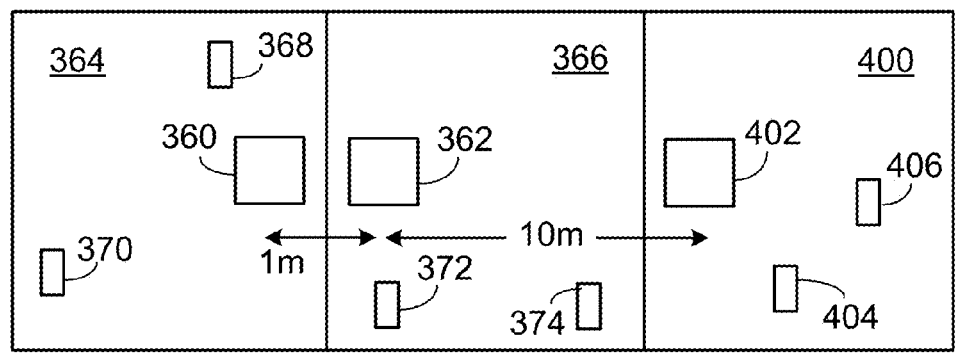
Figure 11B:
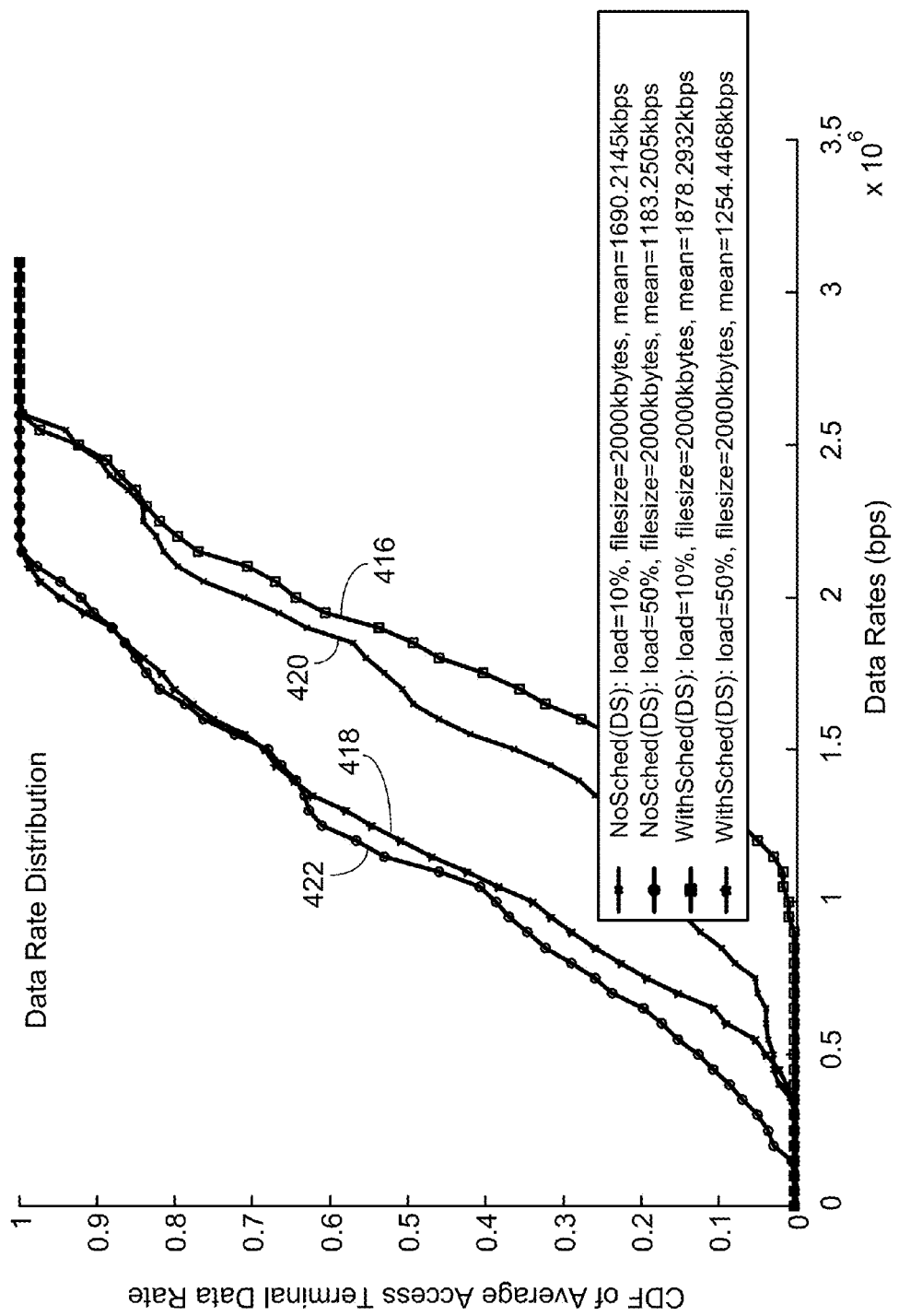

FIG. 11B shows the data rate distribution for all access terminals in the system of FIG. 10. The axes of FIG. 11B correspond to the axes of FIG. 9A. In particular, curves 416, 420 represent the data rate distribution in the type II simulation and the type I simulation under the condition of the load being 10%, respectively. Curves 418, 422 represent the data rate distribution of the type II simulation and the type I simulation under the condition of the load being 50%. A large percentage (e.g., about 60% or about 90%) of access terminals transfer data at a higher rate in the type II simulation than in the type I simulation. The overall average data rate for each access terminal is also improved in the type II simulation relative to the type I simulation. The dynamic scheduling of SM also improves the data transfer at all access terminals in the system.

What is claimed is:

1. A method performed by a first access point configured to operate in first and second modes, the method comprising:
   outputting signals in the first mode, at least some of the signals containing communication data to be sent to a first device, at least some of the signals interfering with communication between a second device and a second access point, wherein,
      in the first mode, the first access point operates at a first power level and, in the second mode, the first access point operates at a second power level for a first period of time and a third power level for a second period of time,
      the first power level is higher than at least the second power level, and
      in the second mode, the first access point is configured to output signals that contain at least some communication data to be sent to the first device;
   determining to operate the first access point in the second mode based on dynamically calculated values of one or more parameters that are related to signal interference at the second device, the one or more parameters comprising a signal-to-noise ratio;
   for a time period during which at least some of the communication data is scheduled to be sent from the first access point to the first device, operating the first access point in the second mode to improve communication at the second access point during at least part of the time period, wherein, in the second mode, the first access point outputs at least some of the communication data during the second period of time; and
   synchronizing operation of the first access point to operation of the second access point such that, for at least a period of time, the first access point operates in the second mode while the second access point operates in the first mode, or the first access point operates in the first mode while the second access point operates in the second mode, wherein synchronizing operation of the first access point is performed based on a pattern of change in mode of the second access point.

2. The method of claim 1, further comprising receiving a request from the second access point to enter the second mode.

3. The method of claim 2, wherein the request is based on values of the signal-to-noise ratio calculated by the second device.

4. The method of claim 3, wherein the values of the signal-to-noise ratio comprise a first value of the signal-to-noise ratio for a signal received from the first access point by the second device, and a second value of the signal-to-noise ratio for another signal received from the second access point by the second device.

5. The method of claim 1, wherein the signal-to-noise ratio is determined based on communications associated with the first and second access points.

6. The method of claim 1, wherein the signal-to-noise ratio is determined based on a lowest throughput of all throughputs of all communication associated with the first and second access points.

7. The method of claim 1, wherein the signal-to-noise ratio is determined based on a sum of all throughputs of all communication associated with the first and second access points.

8. The method of claim 1, further comprising calculating a first value of the signal-to-noise ratio without the first access point entering the second mode and a second value of the signal-to-noise ratio assuming that the first access point is in the second mode.

9. The method of claim 8, wherein determining comprises comparing the first and second values.

10. The method of claim 1, further comprising determining whether the second access point is in the second mode prior to the first access point outputting the signals in the first mode.

11. The method of claim 1, wherein the second power level is nonzero and is lower than the first power level.

12. The method of claim 1, wherein the second power level is zero.

13. One or more non-transitory machine readable media storing instructions that are executable by a first access point configured to operate in first and second modes, the instructions being executable to cause the first access point to perform operations comprising:
   outputting signals in the first mode, at least some of the signals containing communication data to be sent to a first device, at least some of the signals interfering with communication between a second device and a second access point, wherein,
      in the first mode, the first access point operates at a first power level and, in the second mode, the first access point operates at a second power level for a first period of time and a third power level for a second period of time,
      the first power level is higher than at least the second power level, and
      in the second mode, the first access point is configured to output signals that contain at least some communication data to be sent to the first device;
   determining to operate the first access point in the second mode based on dynamically calculated values of one or more parameters that are related to signal interference at the second device, the one or more parameters comprising a signal-to-noise ratio;
   for a time period during which at least some of the communication data is scheduled to be sent from the first access point to the first device, operating the first access point in the second mode to improve communication at the second access point during at least part of the time period, wherein, in the second mode, the first access point outputs at least some of the communication data during the second period of time; and
   synchronizing operation of the first access point to operation of the second access point such that, for at least a period of time, the first access point operates in the second mode while the second access point operates in the first mode, or the first access point operates in the first mode while the second access point operates in the second mode, wherein synchronizing operation of the first access point is performed based on a pattern of change in mode of the second access point.

14. The one or more non-transitory machine readable media of claim 13, wherein the operations comprise calculating the signal-to-noise ratio based on communications associated with the first and second access points.

15. The one or more non-transitory machine readable media of claim 13, wherein the operations comprise calculating the signal-to-noise ratio based on a sum of all throughputs of all communication associated with the first and second access points or a lowest throughput of all throughputs of all communication associated with the first and second access points.

16. The one or more non-transitory machine readable media of claim 13, wherein the operations comprise calculating a first value of the signal-to-noise ratio without the first access point entering the second mode and a second value of the signal-to-noise ratio assuming that the first access point is in the second mode.

17. The one or more non-transitory machine readable media of claim 16, wherein determining comprises comparing the first and second values.

18. The one or more non-transitory machine readable media of claim 13, wherein the operations comprise determining whether the second access point is in the second mode prior to the first access point outputting the signals in the first mode.

19. The one or more non-transitory machine readable media of claim 13, wherein the second mode comprises operation at a lower, but non-zero, power than the first mode.

20. The one or more non-transitory machine readable media of claim 19, wherein the second mode comprises a corresponding access point powered-off, and the first mode comprises operation of the corresponding access point at a power level.

21. A first access point configured to operate in first and second modes, comprising:
   memory to store instructions that are executable; and
   one or more processing devices to execute instructions to perform operations comprising:
      outputting signals in the first mode, at least some of the signals containing communication data to be sent to a first device, at least some of the signals interfering with communication between a second device and a second access point, wherein,
         in the first mode, the first access point operates at a first power level and, in the second mode, the first access point operates at a second power level for a first period of time and a third power level for a second period of time,
         the first power level is higher than at least the second power level, and
         in the second mode, the first access point is configured to output signals that contain at least some communication data to be sent to the first device;
      determining to operate the first access point in the second mode based on dynamically calculated values of one or more parameters that are related to signal interference at the second device, the one or more parameters comprising a signal-to-noise ratio;
      for a time period during which at least some of the communication data is scheduled to be sent from the first access point to the first device, operating the first access point in the second mode to improve communication at the second access point during at least part of the time period, wherein, in the second mode, the first access point outputs at least some of the communication data during the second period of time; and
      synchronizing operation of the first access point to operation of the second access point such that, for at least a period of time, the first access point operates in the second mode while the second access point operates in the first mode, or the first access point operates in the first mode while the second access point operates in the second mode, wherein synchronizing operation of the first access point is performed based on a pattern of change in mode of the second access point.

22. The first access point of claim 21, wherein the operations comprise calculating the signal-to-noise ratio based on communications associated with the first and second access points.

23. The first access point of claim 21, wherein the operations comprise receiving a request from the second access point to enter the second mode.

24. The first access point of claim 23, wherein the request is based on values of the signal-to-noise ratio calculated by the second device for signals received by the second device.

25. The first access point of claim 24, wherein the values of the signal-to-noise ratio comprise a first value of the signal-to-noise ratio for a signal received from the first access point by the second device, and a second value of the signal-to-noise ratio for another signal received from the second access point by the second device.

26. The first access point of claim 21, wherein the signal-to-noise ratio is based on a lowest throughput of all throughputs of all communication associated with the first and second access points.

27. The first access point of claim 21, wherein the signal-to-noise ratio is based on a sum of all throughputs of all communication associated with the first and second access points.

28. The first access point of claim 21, wherein the operations comprise calculating a first value of the signal-to-noise ratio without the first access point entering the second mode and a second value of the signal-to-noise ratio assuming that the first access point is in the second mode.

29. The first access point of claim 28, wherein determining comprises comparing the first and second values.

30. The first access point of claim 21, wherein the operations comprise determining whether the second access point is in the second mode prior to the first access point outputting the signals in the first mode.

31. The first access point of claim 21, wherein the second mode comprises operation at a lower, but non-zero, power than the first mode.

32. The first access point of claim 21, wherein the second mode comprises a corresponding access point powered-off, and the first mode comprises operation of the corresponding access point at a power level.

33. A system comprising:
a first access point configured to operate in first and second modes, the first access point being configured to output signals, at least some of the signals containing communication data to be sent to a first device,
in the first mode, the first access point operates at a first power level and, in the second mode, the first access point operates at a second power level for a first period of time and a third power level for a second period of time,
the first power level is higher than at least the second power level, and
in the second mode, the first access point is configured to output signals that contain at least some communication data to be sent to the first device; and
a second access point in communication with a second device and configured to operate in the first and second modes, at least some of the signals output by the first access point interfering with the communication;
wherein the first access point is configured to execute instructions to perform operations comprising:
determining to operate the first access point in the second mode based on dynamically calculated values of one or more parameters that are related to signal interference at the second device, the one or more parameters comprising a signal-to-noise ratio;
for a time period during which at least some of the communication data is scheduled to be sent from the first access point to the first device, operating the first access point in the second mode to improve communication at the second access point during at least part of the time period, wherein, in the second mode, the first access point outputs at least some of the communication data during the second period of time; and
synchronizing operation of the first access point to operation of the second access point such that, for at least a period of time, the first access point operates in the second mode while the second access point operates in the first mode, or the first access point operates in the first mode while the second access point operates in the second mode, wherein synchronizing operation of the first access point is performed based on a pattern of change in mode of the second access point.

34. The system of claim 33, wherein the second access point is configured to neglect a communication request from the second device during a time when the first access point is in the second mode.

* * * * *